United States Patent
Kawaguchi et al.

(10) Patent No.: US 9,031,286 B2
(45) Date of Patent: May 12, 2015

(54) OBJECT DETECTION DEVICE AND OBJECT DETECTION METHOD

(75) Inventors: Kyoko Kawaguchi, Tokyo (JP); Masamoto Tanabiki, Kanagawa (JP); Kensuke Maruya, Osaka (JP); Yuji Sato, Tokyo (JP); Mitsuko Fujita, Tokyo (JP)

(73) Assignee: Panasonic Corporation, Osaka (JP)

( * ) Notice: Subject to any disclaimer, the term of this patent is extended or adjusted under 35 U.S.C. 154(b) by 164 days.

(21) Appl. No.: 13/989,192

(22) PCT Filed: Nov. 22, 2011

(86) PCT No.: PCT/JP2011/006498
§ 371 (c)(1),
(2), (4) Date: May 23, 2013

(87) PCT Pub. No.: WO2012/077286
PCT Pub. Date: Jun. 14, 2012

(65) Prior Publication Data
US 2013/0243259 A1    Sep. 19, 2013

(30) Foreign Application Priority Data
Dec. 9, 2010   (JP) ................... 2010-274674

(51) Int. Cl.
*G06K 9/00* (2006.01)
*G06K 9/32* (2006.01)

(52) U.S. Cl.
CPC ... *G06K 9/00375* (2013.01); *G06T 2207/10016* (2013.01); *G06K 9/00369* (2013.01); *G06K 9/3241* (2013.01)

(58) Field of Classification Search
None
See application file for complete search history.

(56) References Cited

U.S. PATENT DOCUMENTS

2007/0289799 A1    12/2007  Aoki et al.
2010/0277489 A1*   11/2010  Geisner et al. ............... 345/581
(Continued)

FOREIGN PATENT DOCUMENTS

| CN | 101093164 | 12/2007 |
| CN | 101599177 A | 12/2009 |
| CN | 101604447 A | 12/2009 |

(Continued)

OTHER PUBLICATIONS

Masamichi Shimosaka et al "Motion Recognition Using Shape Features in Monocular Images," in the collection of presentation papers from the 70th National Convention in 2008 (5), Information Processing Society of Japan, Mar. 13, 2008, p. 5-93, p. 5-94.

(Continued)

*Primary Examiner* — Shervin Nakhjavan
(74) *Attorney, Agent, or Firm* — Pearne & Gordon LLP

(57) ABSTRACT

Disclosed is an object detection method capable of detecting with high precision information relating to a jointed object from image data. An object detection device (160) detects information relating to an object from image data of images captured of an object having multiple parts connected by joints. The disclosed object detection device (160) is provided with a joint angle extraction unit (161) which extracts the angle of a joint connecting two parts from candidates of the positions of two neighboring parts obtained from the image data, and a part length ratio estimation unit (165) which uses the joint angle to perform the detection described above.

6 Claims, 21 Drawing Sheets

(56) References Cited

U.S. PATENT DOCUMENTS

2011/0301934 A1* 12/2011 Tardif ............................ 704/1
2012/0056800 A1* 3/2012 Williams et al. ............. 345/156

FOREIGN PATENT DOCUMENTS

| | | |
|---|---|---|
| CN | 101789125 A | 7/2010 |
| JP | 2005-165923 A | 6/2005 |
| JP | 2005-351814 A | 12/2005 |
| JP | 2007-004732 A | 1/2007 |
| JP | 2008-002838 A | 1/2008 |
| JP | 2010-015472 A | 1/2010 |
| JP | 2010-165003 A | 7/2010 |
| WO | 2006/052853 A2 | 5/2006 |

OTHER PUBLICATIONS

P. Viola and M. Jones "Rapid Object Detection Using a Boosted Cascade of Simple Features," in Proc. of CVPR, vol. 1, Dec. 2001, pp. 511-518.

International Search Report for PCT/JP2011/006498 dated Jan. 24, 2012.

Search Report for Chinese Patent Application No. 201180054686.7 dated Dec. 22, 2014.

* cited by examiner

| IDENTIFIER | PROJECTION ANGLE | COORDINATES OF LEFT SHOULDER POSITION | COORDINATES OF GEOMETRIC CENTER POSITION OF HEAD | ORIENTATION OF REFERENCE PART (DEGREES) |
|---|---|---|---|---|
| 1 | 45 | 1, 0 | $0.5, \frac{1}{2}\sqrt{3}$ | 0, 0, 0 |
| 2 | 45 | $\frac{1}{\sqrt{2}}, \frac{1}{\sqrt{2}}$ | 0.3, 1.2 | 0, 45, 0 |
| ... | ... | ... | ... | ... |

FIG. 10

| IDENTIFIER | PROJECTION ANGLE | HEAD-SHOULDER REGION POSITION (RIGHT SHOULDER POSITION IN IMAGE) | HEAD-SHOULDER REGION ORIENTATION (ANGLE) | RIGHT UPPER ARM (CENTER COORDINATES AND RADIUS) | LEFT UPPER ARM (CENTER COORDINATES AND RADIUS) | ... |
|---|---|---|---|---|---|---|
| 1 | 45 | 300, 250 | 0, 0, 0 | 300, 250, 100 | 350, 250, 100 | ... |
| 2 | 45 | 300, 250 | 0, 45, 0 | ... | ... | ... |
| ... | ... | ... | ... | ... | ... | ... |

FIG. 11

OBJECT DETECTION DEVICE AND OBJECT DETECTION METHOD

TECHNICAL FIELD

The present invention relates to an object detection apparatus and an object detection method that perform detection of information regarding an object having a plurality of parts articulated by joints, from image data that images the object.

BACKGROUND ART

Human posture estimation based on image data from a captured video sequence has been an active area of research in recent years. This is because being able to determine human behavior based on videos through computer analysis would make behavior analysis, which is performed in various fields, possible without requiring human effort. Examples of behavior analysis include abnormal behavior detection on the streets, purchasing behavior analysis in stores, factory streamlining support, and form coaching in sports.

In this respect, PL 1, for example, discloses a technique for estimating the posture state of a person based on image data captured with a monocular camera. In the technique disclosed in PL 1 (hereinafter referred to as "related art technique"), part candidates are first extracted based on elliptical shapes or parallel lines contained in the captured image. Next, the related art technique uses a likelihood function, which is statistically derived from a plurality of sample images, to compute part likelihoods and part relation likelihoods. The related art technique then computes the optimal combination of part candidates based on these likelihoods. The use of the above-mentioned related art technique enables identification as to which part is located at which region, as well as estimation of the posture state of a human regardless of location or orientation of the human.

CITATION LIST

Patent Literature

PTL 1
Japanese Patent Application Laid-Open No. 2005-165923

Non-Patent Literature

NPL 1
Masamichi Shimosaka, Makoto Sato, Taketoshi Mori, and Tomomasa Sato, "Motion Recognition Using Shape Features in Monocular Images," in the collection of presentation papers from the 70$^{th}$ National Convention in 2008 (5), Information Processing Society of Japan, Mar. 13, 2008, p. 5-93, p. 5-94

NPL 2
P. Viola and M. Jones, "Rapid Object Detection Using a Boosted Cascade of Simple Features," in Proc. of CVPR, vol. 1, December, 2001, ppp. 511-518

SUMMARY OF INVENTION

Technical Problem

The related art technique uses a likelihood function that is statistically derived from images of a plurality of persons. Hence, for a subject having a body type different from an average body type of the plurality of persons, the accuracy of each likelihood decreases, so that the accuracies of detection of a person and estimation of his/her posture state decrease. Nevertheless, depending on the intended use, it is difficult to always match the body type of a person in image data with the average body type. Thus, according to the related art technique, it is difficult to accurately estimate the posture state of a person and accurately detect information used for the estimation.

Furthermore, while the related art technique could be applied to various objects, besides humans, having a plurality of parts articulated by joints (e.g., robots), similar problems could still arise in such cases.

An object of the present invention is to provide an object detection apparatus and an object detection method capable of accurately detecting information regarding an object having joints, from image data.

Solution to Problem

An object detection apparatus of the present invention includes an object detection apparatus that detects information regarding an object having a plurality of parts articulated by joints, from image data that images the object, the object detection apparatus including: a joint angle extraction section that extracts an angle of a joint that articulates adjacent two of the parts, from position candidates of the two parts, the position candidates being acquired from the image data; and a part length ratio estimation section that performs the detection using the angle of the joint.

An object detection method of the present invention includes an object detection method that detects information regarding an object having a plurality of parts articulated by joints, from image data that images the object, the object detection method including: extracting an angle of a joint that articulates adjacent two of the parts, from position candidates of the two parts, the position candidates being acquired from the image data; and performing the detection using the angle of the joint.

Advantageous Effects of Invention

With the present invention, information regarding an object having joints can be accurately detected from image data.

BRIEF DESCRIPTION OF DRAWINGS

FIG. 10 is a diagram showing example contents of a reference part correspondence table with respect to Embodiment 1;

FIG. 11 is a diagram showing example contents of a part region correspondence table with respect to Embodiment 1;

DESCRIPTION OF EMBODIMENTS

Figure 1:
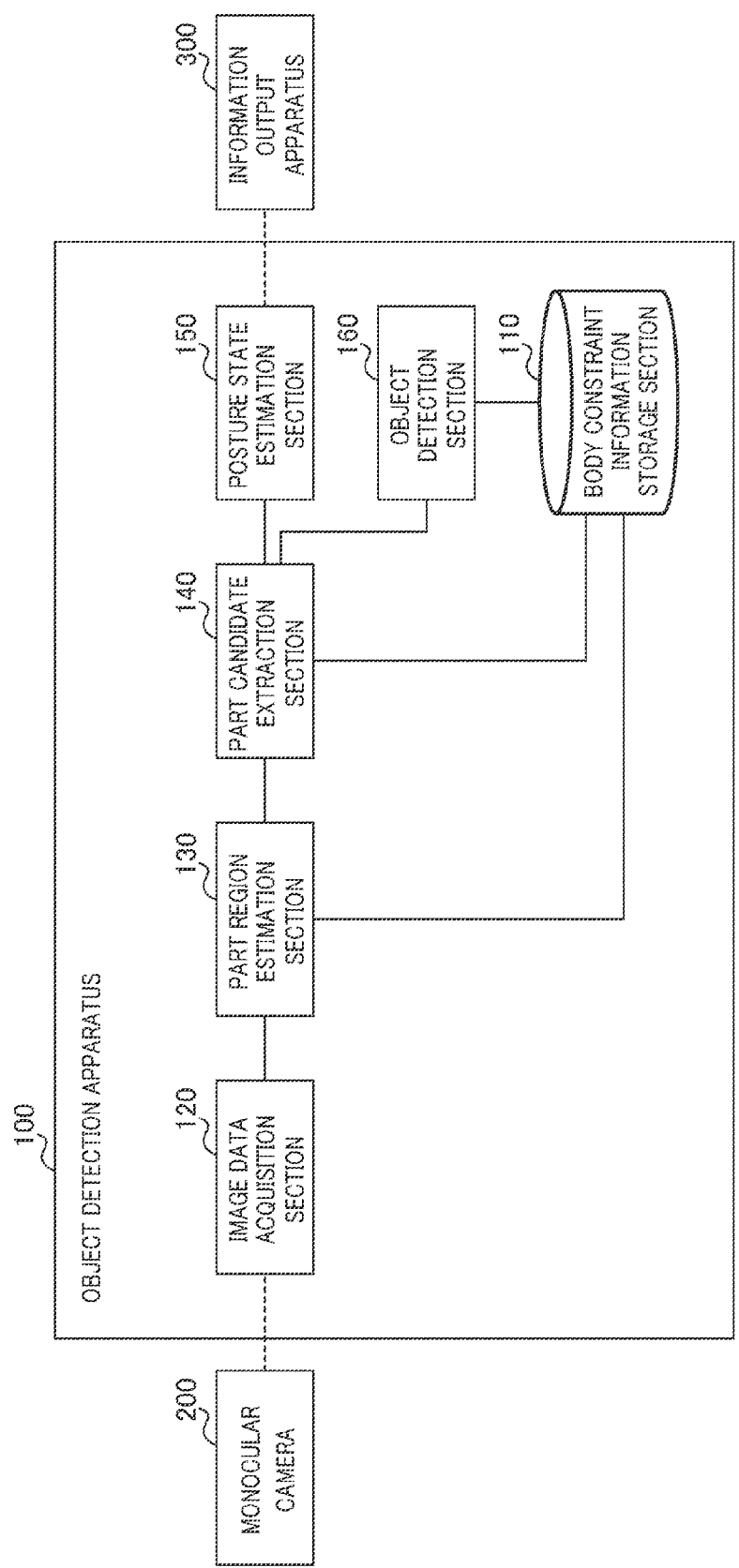
FIG. 1 is a block diagram showing a configuration example of an object detection apparatus according to Embodiment 1 of the present invention.

An embodiment of the present invention is described in detail below with reference to the drawings.

(Embodiment 1)

Embodiment 1 of the present invention is an example in which the present invention is applied to an apparatus that estimates the posture state of a person taken as a moving image.

In the description below, the term "part" refers to one unit among portions of the human anatomy divided by joints. In other words, the term part may refer to, for example, the head, the shoulders, the right upper arm, the right forearm, the left upper arm, the left forearm, the right thigh, the right crus, the left thigh, or the left crus. Further, the term "part region" refers to a region that could be occupied by a given part within an image, i.e., the range of motion of a part.

The term "part axis" refers to an imaginary center axis that runs through the length of a given part. Specifically, the term part axis refers to a line segment that connects: a joint that articulates a given part with a first other part; and a joint that articulates the given part with a second other part or the end portion of the given part. By way of example, the position, orientation, and length of the part axis of the right upper arm generally coincide with the position, orientation, and length of the center axis of the bone of the right upper arm.

The term "part length" refers to the length of a part axis (the longitudinal length of a part). Specifically, the term part length refers to a distance between: a joint that articulates a given part with a first other part; and a joint that articulates the given part with a second other part or the end portion of the given part (for example, the tip of a finger or the top of a head). For example, the part length of the right upper arm generally coincides with the length of the bone of the right upper arm, that is, the length from the right shoulder joint of the right upper arm to the right elbow joint thereof.

The term "part length ratio" refers to a ratio of the part length to a predetermined length. In the present embodiment, the predetermined length is defined as the part length of a corresponding part of a human reference model. The human reference model is a body model that is used to generate body constraint information (to be described later) used by an object detection apparatus according to the present embodiment. The human reference model may have any body shape as long as the body shape can be uniquely determined.

The term "joint angle" refers to an angle between the respective longitudinal axes of two parts. For example, the joint angle of the right elbow is an angle between the part axis of the right upper arm and the part axis of the right forearm.

The term "part candidate" refers to a candidate for the position of a part, which is the position of the part as estimated from image data.

The term "posture state" refers to the type of combination of postures (positions and/or angles) of two or more parts of interest, examples of which may include "right arm is bent," "upright standing state," and the like. "Posture" in this context may be represented by such information as the position of a joint articulating parts, the lengths of the parts concerned, the angle formed between parts, and the like. Accordingly, the term "detection of information regarding an object" refers to a concept that involves acquiring such information and estimating a posture state from such information.

Although descriptions are provided using pixels as basic units for the present embodiments, object detection apparatus 100 may also perform similar processes by treating a group of pixels of a predetermined size as one pixel. This would enable an object detection apparatus to carry out high-speed processing. When treating a plurality of pixels as one pixel, the value of the pixel that is the geometric center of the plurality of pixels may be used as the value of those plurality of pixels, or the average value of the values of the plurality of pixels may be used as the value of those plurality of pixels.

FIG. 1 is a block diagram showing the configuration of an object detection apparatus according to an embodiment of the present invention. For purposes of convenience, peripheral devices of the object detection apparatus are also shown in the drawing.

With respect to FIG. 1, object detection apparatus 100 includes body constraint information storage section 110, image data acquisition section 120, part region estimation section 130, part candidate extraction section 140, posture state estimation section 150, and object detection section 160.

Body constraint information storage section 110 pre-stores constraint conditions regarding human anatomy and posture (hereinafter referred to as "body constraint information"). Body constraint information is information that is used for part region estimation and part candidate extraction, which are hereinafter discussed. The specifics of body constraint information vary depending on the part region estimation method and part candidate extraction method, and as such will be discussed later.

Image data acquisition section 120 obtains, by wire or wirelessly, image data of an image taken with monocular camera 200 installed in a predetermined three-dimensional coordinate space, and outputs it to part region estimation section 130. For the present embodiment, it is assumed that monocular camera 200 is a video camera. Image data acquisition section 120 receives video data captured continuously in real time by monocular camera 200 as input, and sequentially outputs to part region estimation section 130 still image data that form the video data. In the following description, it is assumed that the image data contains images of one person only. However, this is by no means limiting, and it may contain images of a plurality of people, or of none at all.

Figure 2:
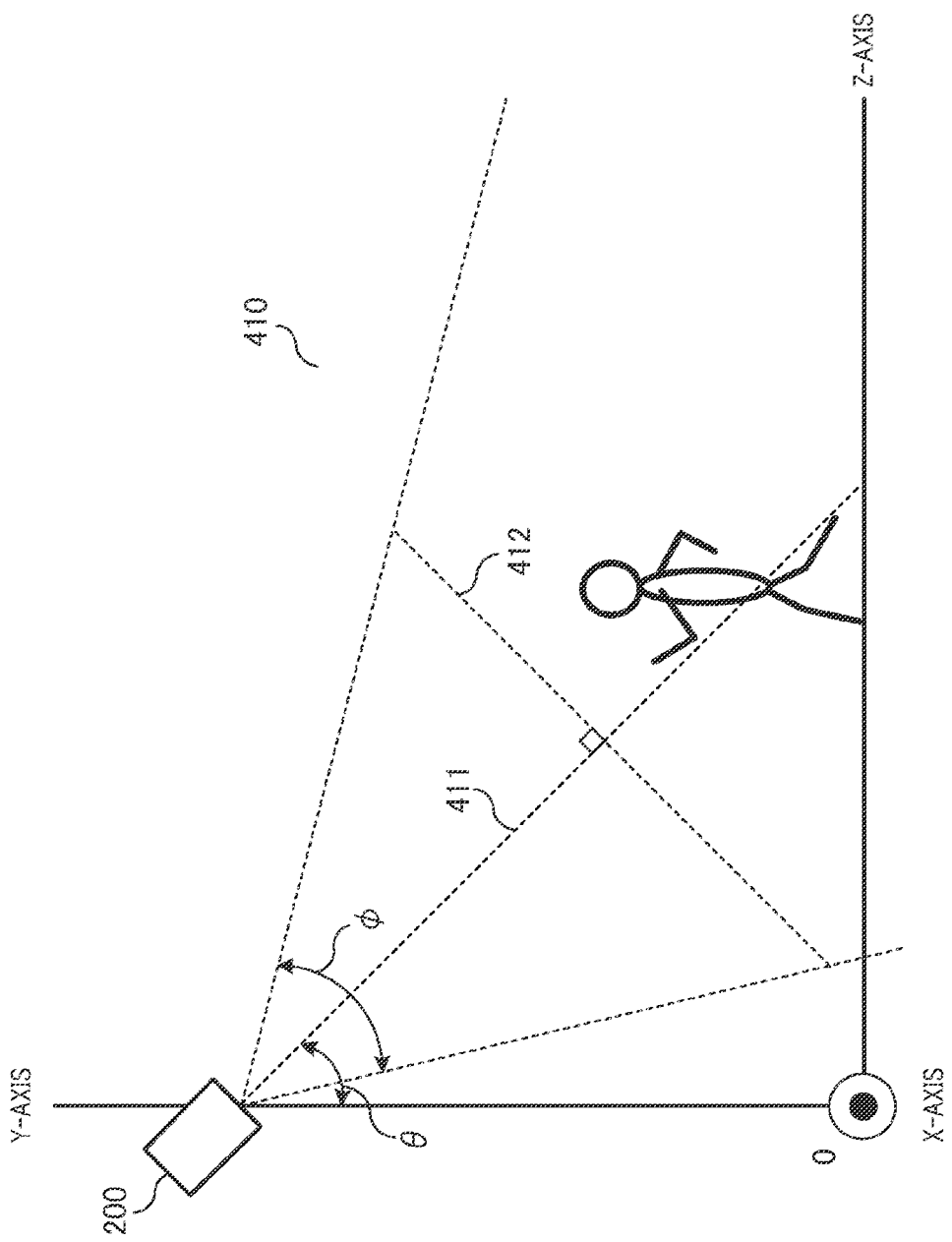
FIG. 2 is a diagram illustrating image data with respect to Embodiment 1.

FIG. 2 is a diagram illustrating image data.

Three-dimensional coordinate system 410 is set up as shown in FIG. 2, where the position of monocular camera 200 as projected onto the ground is taken to be origin O, for example. Coordinate system 410 takes the perpendicular direction to be the Y-axis, a direction orthogonal to the Y-axis and optical axis 411 of monocular camera 200 to be the X-axis, and a direction orthogonal to the X-axis and the Y-axis to be the Z-axis, for example.

The installation angle of monocular camera 200 is denoted by angle θ formed between the Y-axis and optical axis 411, for example. Monocular camera 200 performs imaging by focusing on plane 412 contained in the range within view angle φ of monocular camera 200. Image data of the image thus captured is sent to object detection apparatus 100.

Based on image data received from image data acquisition section 120, part region estimation section 130 in FIG. 1 estimates the part regions of various parts. Specifically, based on the image data, part region estimation section 130 estimates the positions and orientation of reference parts of a person. The reference parts are parts for which position and orientation estimation is performed before any other part, and whose estimation result bears on the position and orientation estimations of other parts. They preferably are parts that allow stable image acquisition in the image acquisition space. With the estimated positions and orientation of the reference parts as references, part region estimation section 130 estimates the part regions of various parts.

For the present embodiment, it is assumed that the reference parts include the head and shoulders of a person. It is assumed that the orientation of the reference parts is the orientation of the shoulders, where the orientation of the shoulders is defined as the direction of a straight line connecting the right shoulder and the left shoulder. Part region estimation section 130 outputs to part candidate extraction section 140 the image data and information indicating the part region of each part (hereinafter referred to as "part region data").

On the basis of the received part region data, part candidate extraction section 140 extracts part candidates from the received image data, and outputs the extracted part candidates to posture state estimation section 150. For the present embodiment, it is assumed that a part candidate is expressed in terms of a position in an image, that is, in terms of a two-dimensional coordinate system for the image. It is assumed that the information indicating the part candidate is a likelihood map indicating a distribution of likelihoods regarding the position of each part.

Part candidate extraction section 140 generates a likelihood map where, for regions other than the part regions indicated by the part region data received from part region estimation section 130, the likelihood that designated parts corresponding to those part regions are located thereat is set low. A likelihood map generated based on image data is hereinafter referred to as an "estimated likelihood map."

Based on the estimated likelihood map received from part candidate extraction section 140, posture state estimation section 150 estimates the posture state of a person (hereinafter referred to as the "subject") in the image data. More specifically, for each posture state, posture state estimation section 150 is provided with, in advance, likelihood maps learned from a reference model in that posture state (hereinafter referred to as "learned likelihood maps"). If the estimated likelihood map and any of the learned likelihood maps match each other closely, posture state estimation section 150 estimates the posture state corresponding to the relevant learned likelihood map to be the posture state of the subject. Posture state estimation section 150 sends, by wire or wirelessly, information to information output apparatus 300 (e.g., a display apparatus), thus notifying the user of the estimation result. Posture state estimation section 150 may also estimate the orientation of the subject (e.g., whether the subject is seated facing right, seated facing left, and/or the like) in addition to its posture state.

Object detection section 160 extracts the angle of a joint that articulates adjacent two parts, from part candidates of the two parts, the part candidates being acquired from the image data. On the basis of the extracted angle of the joint, object detection section 160 estimates information regarding the part length ratio of the subject.

Figure 3:
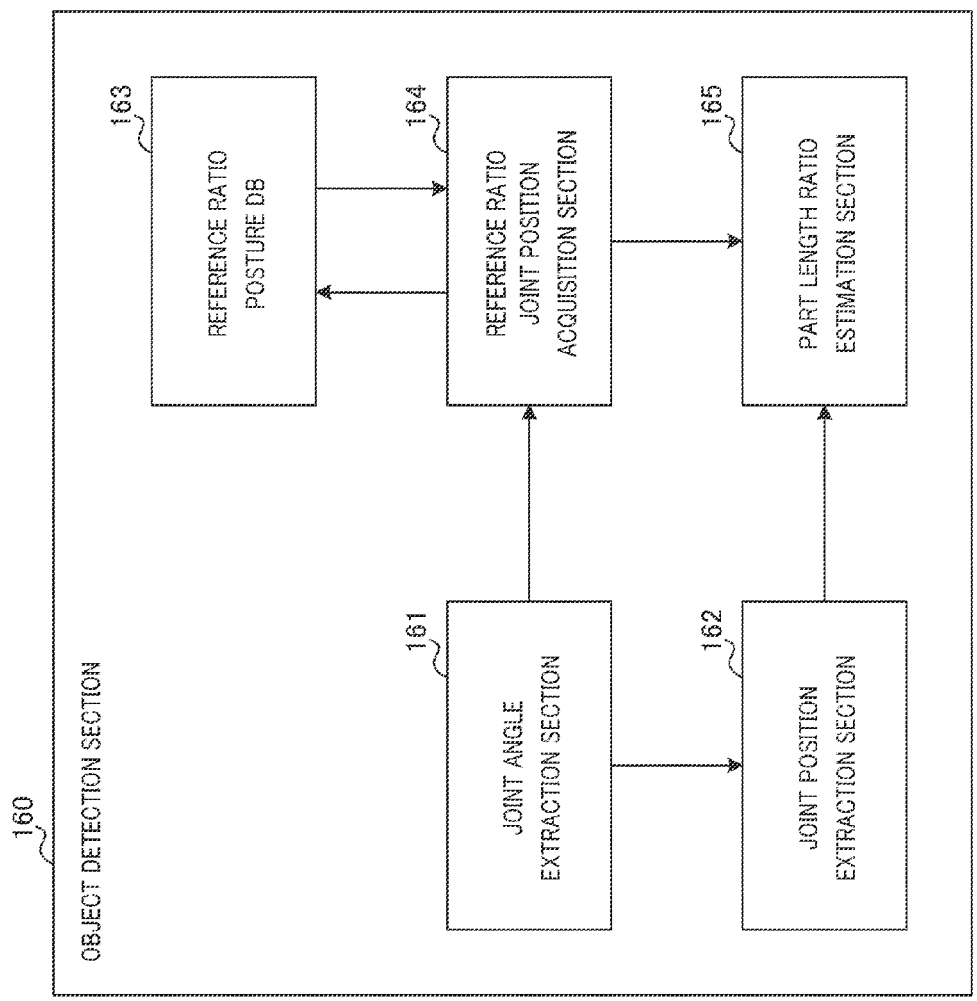
FIG. 3 is a block diagram showing a configuration example of an object detection section according to Embodiment 1.

FIG. 3 is a block diagram showing a configuration of object detection section 160.

In FIG. 3, object detection section 160 includes joint angle extraction section 161, joint position extraction section 162, reference ratio posture database (DB) 163, reference ratio joint position acquisition section 164, and part length ratio estimation section 165.

Joint angle extraction section 161 extracts, from the received part candidates of each part, an angle between the respective longitudinal axes of adjacent two parts as the joint angle of a joint that articulates the two parts. Then, joint angle extraction section 161 outputs the positions and directions of the part axes of the two parts forming the extracted joint angle, to joint position extraction section 162. Joint angle extraction section 161 outputs the extracted joint angle to reference ratio joint position acquisition section 164. Note that, in the present embodiment, the joint angle is assumed to be expressed as an angle in an image.

Joint position extraction section 162 extracts, from the received positions and directions of the part axes, the joint position of the joint formed by the two parts. Then, joint position extraction section 162 outputs the extracted joint position of the joint to part length ratio estimation section 165. The joint position extracted from the image data is hereinafter referred to as "extracted joint position". Note that, in the present embodiment, the joint position is assumed to be expressed as an absolute position in an image.

Reference ratio posture DB 163 holds in advance information regarding human reference models (hereinafter referred to as "reference model information"). For example, with respect to each state in an image representing a posture state as viewed from a given perspective (hereinafter referred to as "image posture state"), the reference model information may include information indicating the joint angle and position of each joint in the image (e.g., the part length and range of motion of each part in the image). In other words, the reference model information is constraint conditions regarding body types and postures of reference models.

It is desirable that the reference model information be information of a reference model used for learning of the above-mentioned learned likelihood map.

Reference ratio joint position acquisition section 164 estimates the image posture state of a joint angle closest to the joint angle received from joint angle extraction section 161, and acquires the position of each joint of the reference model in the estimated image posture state. Then, reference ratio joint position acquisition section 164 outputs the extracted position to part length ratio estimation section 165. The joint position extracted from the reference model information is hereinafter referred to as "reference ratio joint position".

Note that the image posture state estimated by reference ratio joint position acquisition section 164 does not necessarily coincide with the posture state estimated by posture state estimation section 150. As described above, in the case where the body type of the reference model from which the learned likelihood map originated is greatly different from the body type of the subject, posture state estimation section 150 may make an incorrect estimation, whereas reference ratio joint position acquisition section 164 may make a correct estimation. This is because the joint angle of each joint is substantially the same in the same posture state regardless of body types.

Part length ratio estimation section 165 computes the part length of the subject and the part length of the reference model on the basis of the received extracted joint position and the received reference ratio joint position, to thereby perform part length ratio estimation. Note that, in the present embodiment, the part lengths computed by part length ratio estimation section 165 are assumed to be expressed by an absolute value in a two-dimensional coordinate system of an image. That is, the part length ratio is a ratio of: the part length extracted from the image data; to the part length in the reference model.

Part length ratio estimation section 165 corrects the body constraint information stored in body constraint information storage section 110 on the basis of the received extracted joint position, the received reference ratio joint position, and the estimated part length ratio. Specifically, part length ratio estimation section 165 corrects the body constraint information such that the contents of the body constraint information match with the body type and posture of the subject.

Object detection apparatus 100 may be a computer including a central processing unit (CPU), a storage medium (e.g., random-access memory (RAM)), and/or the like. In other words, object detection apparatus 100 operates by having the CPU execute a stored control program.

Because object detection apparatus 100 described above extracts the angle of each joint of the subject from the image data, the part length ratio can be estimated by comparing the part length of the subject with that of the reference model in the same posture state. Further, because object detection apparatus 100 can acquire the part length ratio of the subject, the body constraint information used for posture state estimation can be corrected so as to match with the body type and the posture. Accordingly, object detection apparatus 100 can accurately detect the part regions, part candidates, and posture states of the subject from the image data.

Object detection apparatus 100 uses a likelihood map representing a distribution of likelihoods for each part. Therefore, even if, for example, the right arm is covered by the outline of the torso in the image, it is possible to determine whether or not the posture state is "right arm is bent".

Because object detection apparatus 100 estimates a part region, which is the range of motion of a specified part, and sets low likelihood values for regions other than the part region, the accuracy of the likelihood map can be improved.

Operations of object detection apparatus 100 will now be described.

Figure 4:
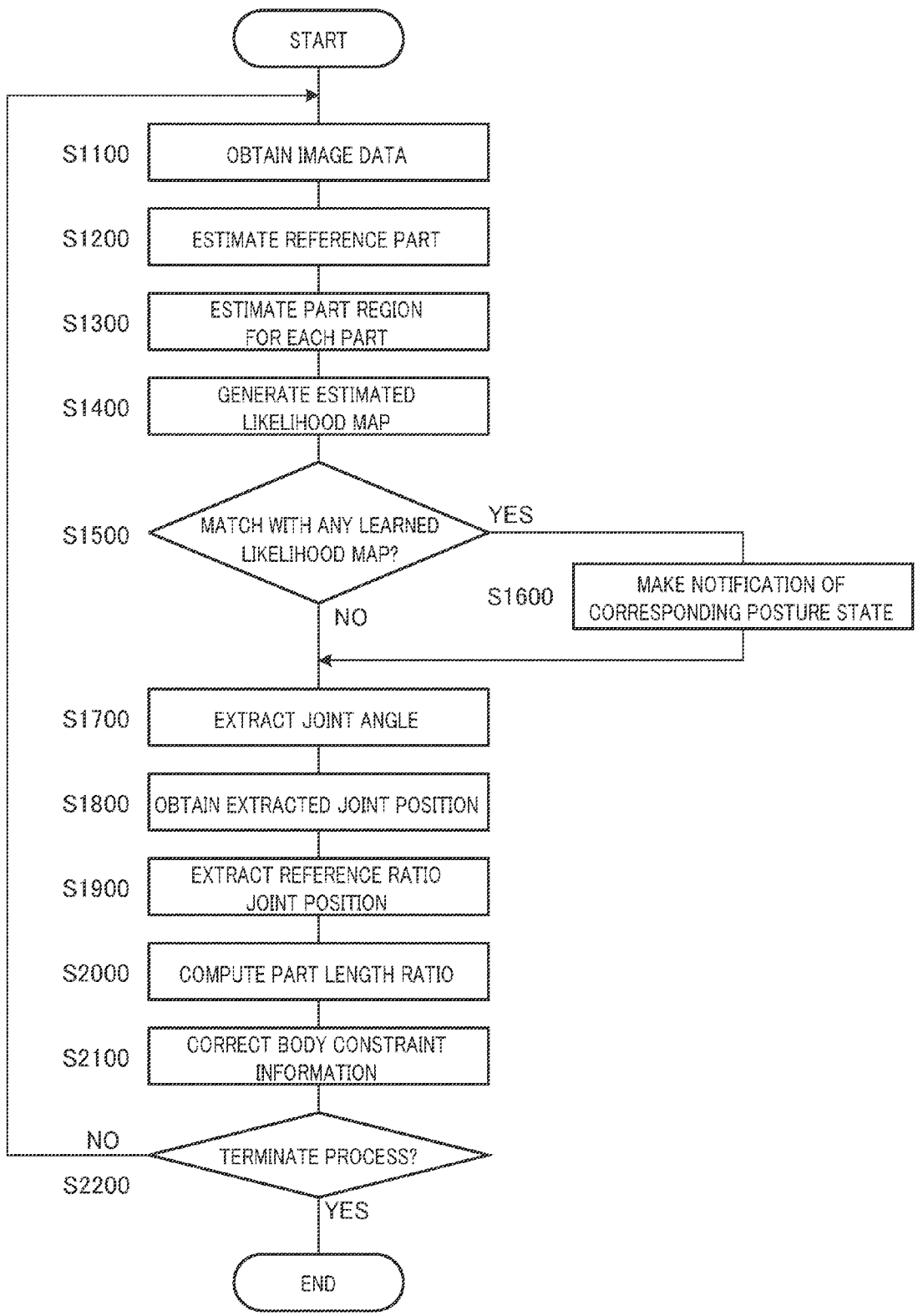
FIG. 4 is a flowchart showing an operation example of an object detection apparatus according to Embodiment 1.

FIG. 4 is a flowchart showing an operation example of object detection apparatus 100.

First, in step S1100, part region estimation section 130 obtains one still image's worth of image data from monocular camera 200 via image data acquisition section 120.

In step S1200, part region estimation section 130 then performs a process of estimating the positions and orientation of reference parts (hereinafter referred to as "reference part estimation process").

An example of the details of the reference part estimation process will now be described. Broadly speaking, the reference part estimation process includes a first process of estimating the shoulder joint positions of a person, and a second process of estimating the orientation of the torso of a person.

The first process of estimating the shoulder joint positions of a person will be described first.

Part region estimation section 130 detects an omega shape from the image data, and estimates shoulder joint positions based on the omega shape.

Figure 5:
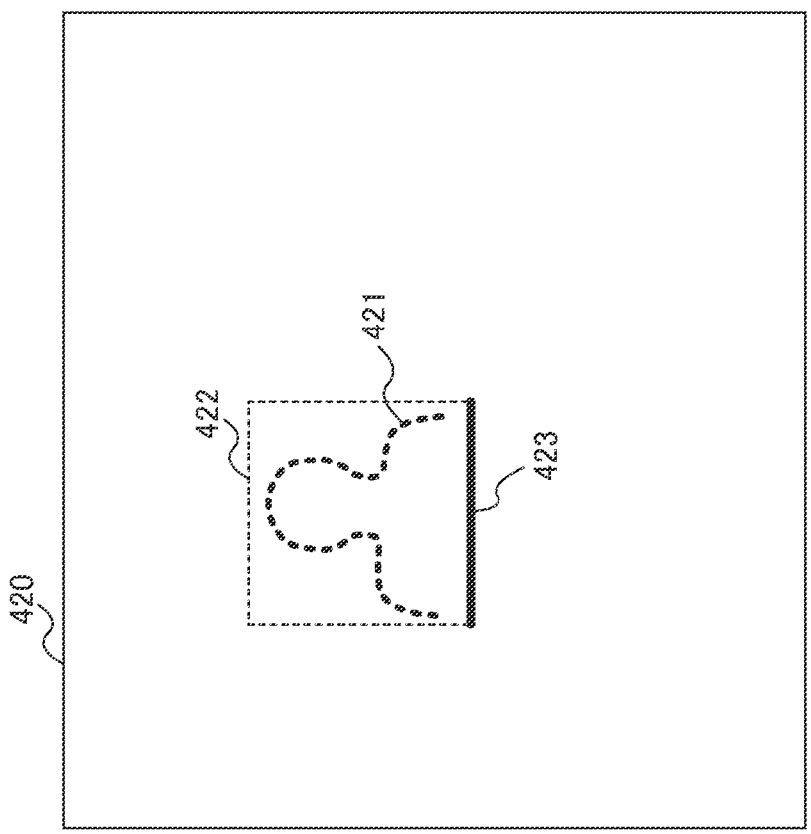
FIG. 5 is diagram illustrating an omega shape with respect to Embodiment 1.

FIG. 5 is a diagram illustrating an omega shape.

An omega (Ω) shape is a characteristic edge shape of a region that encompasses the head and shoulders of a person, and is a shape having a high probability that, with regard to the human body, imaging would be carried out most stably when a surveillance camera or the like is used. Further, the positions of the head and shoulders relative to the torso of a person vary little. Accordingly, part region estimation section 130 first detects an omega shape to detect the positions of the head and shoulders of a person. It then estimates part regions for other parts relative thereto, thus accurately estimating part regions.

An omega shape may be detected using a detector created with Real AdaBoost and/or the like using a sufficient number of sample images, for example. Examples of features used for the detector may include histogram of gradient (HoG) features, Sparse features, Haar features, and/or the like. Besides boosting algorithms, other learning algorithms such as support vector machines (SVMs), neural networks, and/or the like may also be employed.

Part region estimation section 130 first detects omega shape 421 from image 420 of the image data. Of the pixels in omega region 422, the pixels forming omega shape 421 (the pixels at the edge portion) are of a digital signal of "1," while the rest of the pixels are of a digital signal of "0." A relatively small rectangular region encompassing omega shape 421 is determined to be omega region 422. The base of omega region 422 is referred to as reference line 423.

Part region estimation section 130 eliminates noise contained in omega region 422. Specifically, of the pixels in omega region 422, part region estimation section 130 deems any digital signal of "1" that is present within the region enclosed by omega shape 421 to be noise and corrects it to a digital signal of "0." This correction may be done by performing a so-called closing process, for example. A closing process is a process that enlarges or reduces an image region by a predetermined number of pixels or by a predetermined proportion. Through this correction, the accuracy of the distance histogram discussed hereinafter may be improved.

Part region estimation section 130 obtains the perpendicular distance from reference line 423 to omega shape 421 at various positions along reference line 423.

Figure 6:
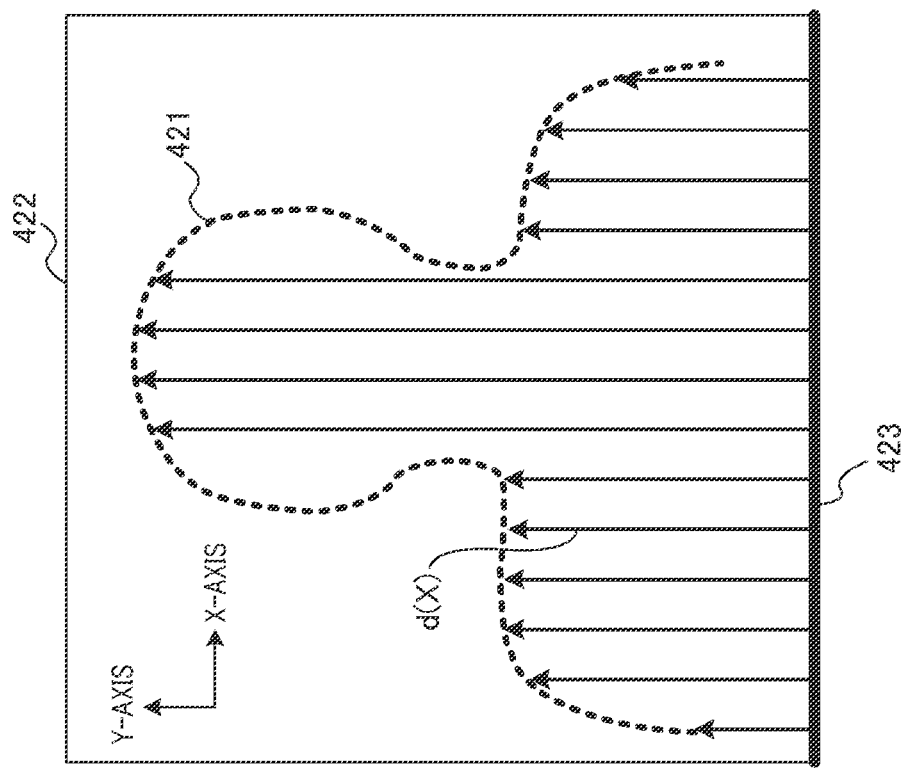
FIG. 6 is a diagram illustrating perpendicular distances from a reference line to an omega shape with respect to Embodiment 1.

FIG. 6 is a diagram illustrating perpendicular distances from reference line 423 to omega shape 421.

As shown in FIG. 6, part region estimation section 130 treats the direction of reference line 423 as the X-axis, and the direction perpendicular to reference line 423 as the Y-axis. Part region estimation section 130 takes the pixel count from the left end of reference line 423 to be the X-coordinate, for example. Part region estimation section 130 acquires, as perpendicular distance d(X), the pixel count in the Y-axis direction from reference line 423 to the pixel forming omega shape 421, that is, the perpendicular distance to omega shape 421. By "the pixel forming omega shape 421," what is meant, for example, is the pixel closest to reference line 423 among pixels with a digital signal of "1."

Part region estimation section 130 generates a distance histogram where n items of perpendicular distance d(X) data are mapped to X-coordinates (where n is a positive integer).

Figure 7:
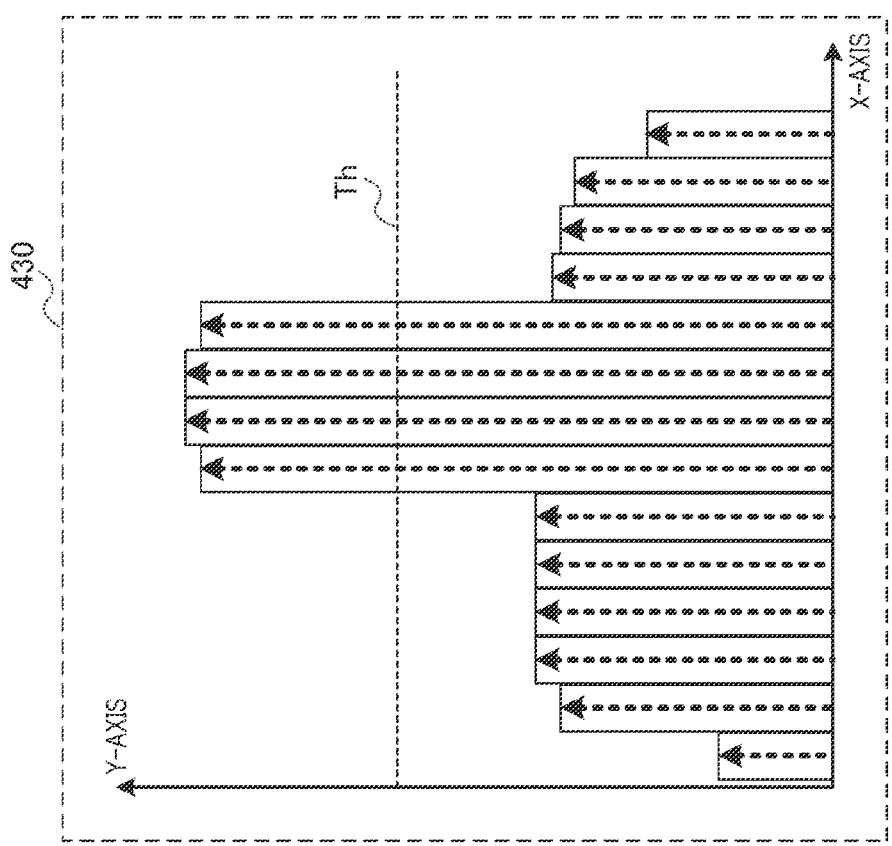
FIG. 7 is a diagram showing an example of a distance histogram with respect to Embodiment 1.

FIG. 7 is a diagram showing an example of a distance histogram generated by part region estimation section 130 based on omega region 422 shown in FIG. 5.

As shown in FIG. 7, in an X-Y coordinate system where the Y-axis represents perpendicular distance d(X), part region estimation section 130 generates distance histogram 430 representing a distribution of perpendicular distance d(X). Distance histogram 430 is so shaped that it rises in a shape corresponding to the shoulders, and at some point protrudes over a range corresponding to the center portion of the head.

By applying predetermined threshold Th, part region estimation section 130 performs thresholding on distance histogram 430 thus generated. Specifically, part region estimation section 130 replaces the Y-coordinates at the X-coordinates where perpendicular distance d(X) is equal to or greater than threshold Th with "1," and the Y-coordinates at the X-coordinates where perpendicular distance d(X) is less than threshold Th with "0." The value of threshold Th is so set that, in omega region 422, it would likely be greater than perpendicular distance d(X) of the upper ends of the shoulders, but less than perpendicular distance d(X) of the upper end of the head. The thresholding process is by no means limited to that above, and other methods may also be employed, one example being what is known as Otsu's thresholding (Otsu's method).

Figure 8:
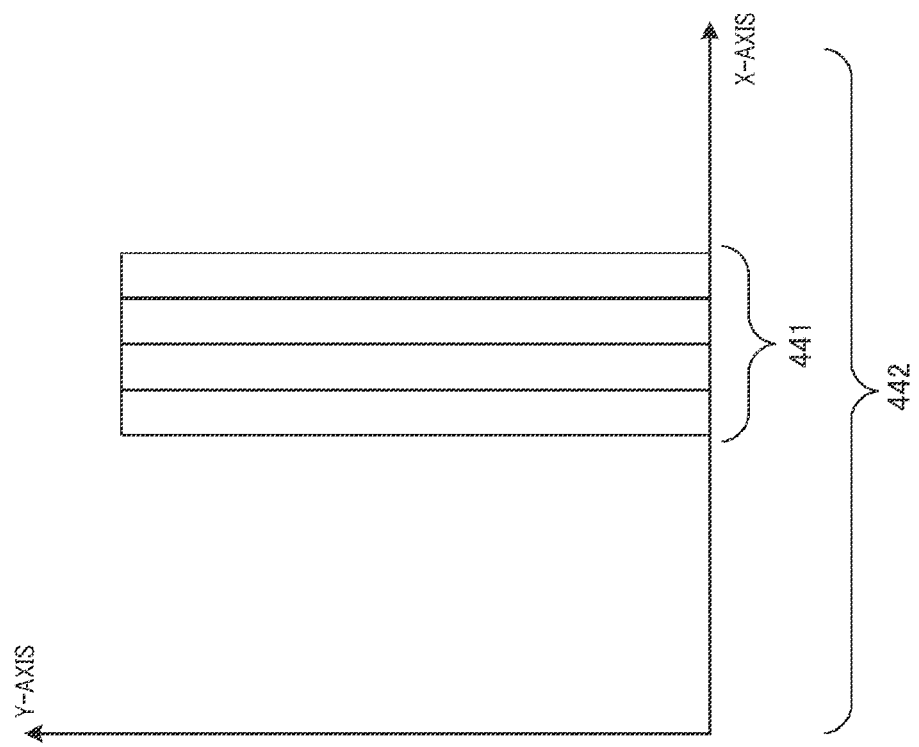
FIG. 8 is a diagram showing an example of a thresholded distance histogram with respect to Embodiment 1.

FIG. 8 is an example of results obtained by thresholding distance histogram 430 shown in FIG. 7.

As shown in FIG. 8, range 441 of value "1" indicates the range of X-coordinates of the image region of the center portion of the head (hereinafter referred to as "head region"). Overall range 442 containing range 441 of value "1" indicates the range of X-coordinates of the image region of the shoulders (hereinafter referred to as "shoulder region"). Accordingly, from image 420 of the image data, part region estimation section 130 extracts the X-axis direction range of omega region 422 as the X-axis direction range of the shoulder region, and the X-axis direction range of range 441 of value "1" as the X-axis direction range of the head region.

Based on the extracted shoulder region and head region, part region estimation section 130 computes various parameters indicating the positions and orientations of the reference parts.

Figure 9:
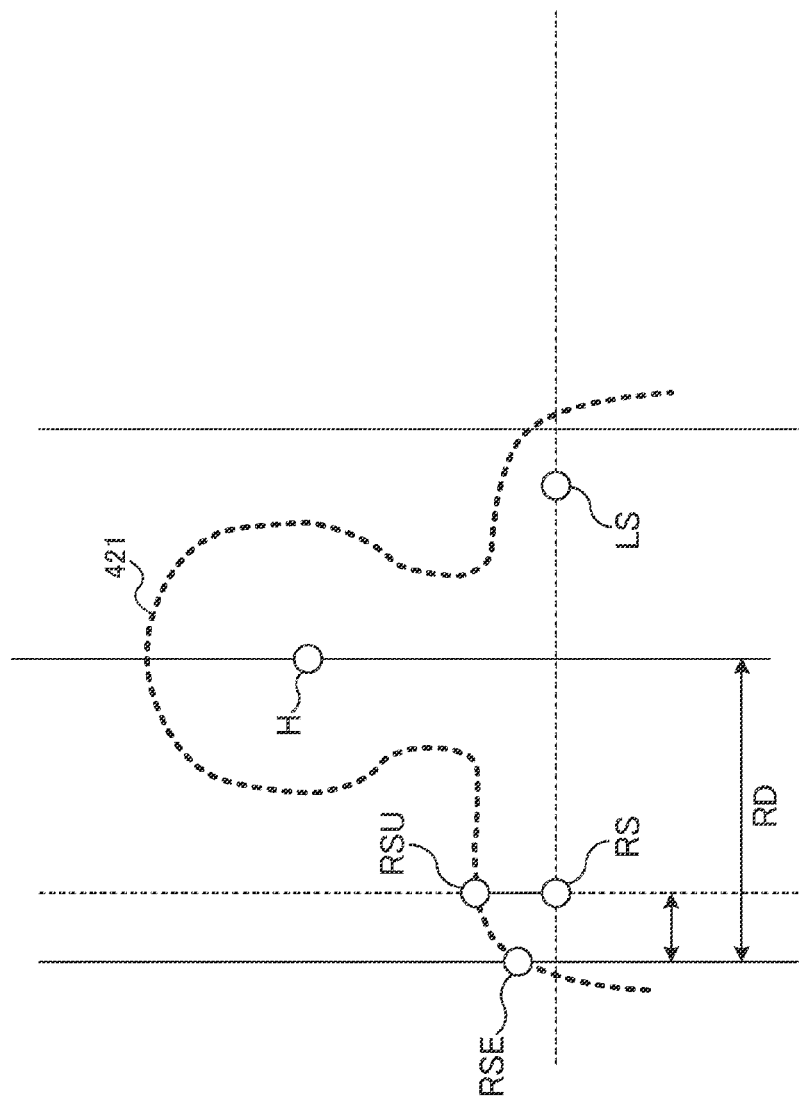
FIG. 9 is a diagram illustrating various parameters indicating reference parts with respect to Embodiment 1.

FIG. 9 is a diagram illustrating various parameters representing the reference parts.

As shown in FIG. 9, it is assumed that part region estimation section 130 uses H(xh, yh), RSE(x_rse), RD(x_rd), RS(x_rs, y_rs), RSU(y_rsu), and LS as symbols indicating the positions of the reference parts (the contents of the parentheses indicate parameters for an X-Y coordinate system). H is the geometric center position of the head. RSE is the position of an end portion of the right shoulder. RD is the distance in the X-axis direction from the geometric center of the head to the end portion of the right shoulder. RS is the position of the right shoulder joint (hereinafter referred to as "right shoulder position"). RSU is the position of the apex of the right shoulder. LS is the position of the left shoulder joint (hereinafter referred to as "left shoulder position").

Part region estimation section 130 computes each parameter value as follows, for example.

First, based on whether or not (the torso of) the person is facing monocular camera 200, part region estimation section 130 determines the right shoulder region from among the shoulder region extracted based on the results of thresholding. Part region estimation section 130 determines whether or not the person is facing monocular camera 200 based on whether or not the skin colored components among the color information in the head region are at or above a predetermined threshold. For the case at hand, it is assumed that the person is facing monocular camera 200, and that the shoulder region on the left side of the image has been determined to be the right shoulder region.

Part region estimation section 130 next computes the geometric center position of the right shoulder region as right shoulder position RS(x_rs, y_rs). Part region estimation section 130 may also compute geometric center position H(xh, yh) of the head, and compute right shoulder position RS(x_rs, y_rs) using the distance between geometric center position H(xh, yh) and original omega shape 421 in the Y-axis direction (hereinafter referred to as "head height Δh"). Specifically, part region estimation section 130 may take a value, which is of a pre-defined ratio to head height Δh, as distance (xh−x_rs) from geometric center position H of the head to right shoulder position RS in the X-axis direction, for example. Part region estimation section 130 may also take a position that is lower than shoulder height by half the value of head height Δh, i.e., by Δh/2, to be the Y-coordinate of right shoulder position RS, i.e., y_rs, for example.

Furthermore, part region estimation section 130 computes, as position RSE(x_rse) of the end portion of the right shoulder, a point at which the edge gradient of omega shape 421 (i.e., the rate of change of the distance histogram) exceeds a threshold. Part region estimation section 130 computes distance RD(x_rd) in the X-axis direction between geometric center position H of the head and position RSE of the end portion of the right shoulder.

Finally, part region estimation section 130 estimates right shoulder position RS to be located at a position that is 80% of distance RD from geometric center position H of the head in the X-axis direction. Specifically, part region estimation section 130 computes X-coordinate x_rs of right shoulder position RS as x_rs=x_rse+0.2×RD. Part region estimation section 130 computes, as position RSU(y_rsu) of the apex of the right shoulder, the point of intersection between a straight perpendicular line that passes through right shoulder position RS (a straight line parallel to the Y-axis) and the edge of omega shape 421. Part region estimation section 130 computes Y-coordinate y_rs of right shoulder position RS as y_rs=y_rsu−0.2×RD.

Part region estimation section 130 carries out similar computations with respect to left shoulder position LS as well.

The computation methods for the various parameters are by no means limited to the examples provided above. By way of example, in the case where part lengths, such as shoulder width (e.g., the distance between right shoulder position RS and left shoulder position LS), are stored in body constraint information storage section 110 as one form of body constraint information, part region estimation section 130 may compute various parameters using that body constraint information.

The second process of estimating the orientation of the torso of a person will now be described.

For the present embodiment, it is assumed that part region estimation section 130 performs the second process by referencing a reference part correspondence table pre-stored in body constraint information storage section 110 as one form of body constraint information.

The reference part correspondence table is a table that defines combinations of geometric center position H of the head, right shoulder position RS, and left shoulder position LS (hereinafter referred to as "positions of the reference parts") in association with the respective body orientations that can be estimated from the positions of the reference parts (hereinafter referred to as "orientations of the reference parts"). In other words, the reference part correspondence table is a table that defines relative positional relationships of various parts. The term "reference parts" refers to the omega-shaped portion indicating the head and shoulders of a person as discussed above. Accordingly, the orientation of the reference parts is the orientation of the body (torso) of a person.

Part region estimation section 130 derives from the reference part correspondence table the orientation of the reference parts corresponding to the positions of the reference parts computed based on the image data.

It is preferable that the positions of the reference parts included in the stored reference part correspondence table, as well as the positions of the reference parts computed by part region estimation section 130 based on the image data be normalized values independent of the size of the person on the screen. Specifically, part region estimation section 130 derives the orientation of the reference parts using values normalized in such a manner that, with geometric center position H of the head as the origin, the distance between geometric center position H of the head and right shoulder position RS or left shoulder position LS would be 1, for example.

The reference part correspondence table may also include right shoulder position RS and left shoulder position LS. The reference part correspondence table may also include the angle formed between a line passing through geometric center position H of the head and right shoulder position RS or left shoulder position LS and a straight perpendicular line passing through geometric center position H of the head (hereinafter referred to as "head perpendicular line"). The reference part correspondence table may also include the distance between geometric center position H of the head and left shoulder position LS relative to the distance between geometric center position H of the head and right shoulder position RS, where the latter distance is defined as being 1. Part region estimation section 130 derives the orientation of the reference parts by computing parameters corresponding to the parameters included in the reference part correspondence table.

FIG. 10 is a diagram showing example contents of a reference part correspondence table.

As shown in FIG. 10, reference part correspondence table 450 includes projection angle 452, coordinates 453 of left shoulder position LS, coordinates 454 of geometric center position H of the head, and reference part orientation 455, which are mapped to identifier 451. The various coordinates are expressed using a predetermined two-dimensional coordinate system parallel to the two-dimensional coordinate system of the screen, where right shoulder position RS is taken to be the origin, for example. Projection angle 452 is the angle of this predetermined two-dimensional coordinate system relative to the X-Z plane of three-dimensional coordinate system 410 described in connection with FIG. 2 (i.e., installation angle θ shown in FIG. 2), for example. Reference part orientation 455 is expressed as rotation angles relative to the X-, Y-, and Z-axes of three-dimensional coordinate system 410 described in connection with FIG. 2, for example. Each coordinate may also be expressed using a coordinate system that takes some other length to be 1, such as a part length of the arms, one's height, etc.

Part region estimation section 130 thus estimates the positions and orientation of the reference parts using body constraint information. This concludes this description of a reference part estimation process.

Next, in step S1300 in FIG. 4, part region estimation section 130 performs a process of estimating a part region for each part (hereinafter referred to as "part region estimation process") based on the estimated positions and orientation of the reference parts.

Example details of the part region estimation process will now be described.

For the present embodiment, it is assumed that part region estimation section 130 performs the part region estimation process by referencing a part region correspondence table pre-stored in body constraint information storage section 110 as one form of body constraint information.

The part region correspondence table is a table that maps the positions and orientation of the reference parts to part regions of other parts.

Part region estimation section 130 derives from the part region correspondence table a part region corresponding to the positions and orientation of the reference parts estimated from the image data.

Part regions may be defined in terms of pixel positions in the image of the image data, for example. Accordingly, with respect to all pixels in the entire image of the image data, part region estimation section 130 determines which part's part region each pixel belongs to.

FIG. 11 is a diagram showing example contents of a part region correspondence table.

As shown in FIG. 11, part region correspondence table 460 includes head-shoulder region (reference parts) position 463, head-shoulder region (reference parts) orientation 464, and region 465 of each part, which are mapped to identifier 461.

Each position and region is represented by values of a two-dimensional coordinate system for the image, for example. Projection angle 462 is the angle of this predetermined two-dimensional coordinate system relative to the X-Z plane of three-dimensional coordinate system 410 described in connection with FIG. 2 (i.e., installation angle θ shown in FIG. 2), for example. Head-shoulder region position 463 is right shoulder position RS, for example. Head-shoulder region orientation 464 is expressed as rotation angles relative to the X-, Y-, and Z-axes of three-dimensional coordinate system 410 described in connection with FIG. 2, for example. Region 465 of each part is expressed in terms of the center coordinates and radius of a circle, assuming that the region can be approximated by a circle, for example. The radius is the part length.

If identifier 461 is the same as identifier 451 in reference part correspondence table 450, head-shoulder region orientation 464 does not necessarily have to be included in part region correspondence table 460.

In estimating part regions, other types of body constraint information may also be used. Furthermore, body constraint information may adopt configurations other than those discussed above.

Other body constraint information that may be used for part region estimation will now be described.

By way of example, with at least one of the length of a predetermined part and the angle of a joint as a reference, body constraint information limits the region in which a part that articulates with the predetermined part may lie (i.e., the part region). In this case, the body constraint information includes at least one of a ratio of a given part's length to another part's length and the angle range of motion of a joint, for example. The body constraint information may specify that, where the shoulder width is defined as being 1, the length of the upper arm is 0.6, for example.

By way of example, the body constraint information includes information that describes, for each part and, a part length ratio and freedom of movement in three directions (X-axis direction, Y-axis direction, and Z-axis direction) where the joint closer to the torso is taken to be the pivot point.

For the body constraint information, assuming, for example, that the part ID for the right upper arm is "3" and that the ratio of the part length of the right upper arm to the part length of the shoulders is "0.8," the part length of the right upper arm may be specified by a file or program source written as follows.
Begin
    Part ID: 3
    Length ratio: 0.8
End For the body constraint information, assuming, for example, that the part ID for the right upper arm is "3" and that the ratio of the thickness of the right upper arm to the part length of the shoulders is "0.2," the part thickness of the right upper arm may be specified by a file or program source written as follows.
Begin
    Part ID: 3
    Thickness ratio: 0.2
End Furthermore, it is assumed, for example, that the joint ID for the right shoulder is "100," that the part ID for the shoulders is "1," and that the part ID for the right upper arm is "3." It is also assumed that the movable directions of the right upper arm are (−60.0, 90.0) with respect to the X-axis, (−90.0, 90.0) with respect to the Y-axis, and (−90.0, 90.0) with respect to the Z-axis. In this case, the body constraint information may specify the freedom of the right upper arm with respect to the right shoulder joint by a file or program source written as follows, for example.
Begin
    Joint ID: 100
    Part ID: 1
    Part ID: 3
    Movable directions: rx, ry, rz
    Angles: (−60.0, 90.0), (−90.0, 90.0), (−90.0, 90.0)
End For the cases above, the information indicating the articular relationship between joints and parts represented by joint IDs and part IDs, and the information indicating the movable directions and angles of each joint may be written in separate files.

The body constraint information may also be written in terms of information obtained by projecting each position onto a two-dimensional coordinate system. In this case, even if the positional information is unique three-dimensionally, its value may vary depending on the projection angle. Furthermore, movable directions and angles would be two-dimensional values. Accordingly, if body constraint information storage section 110 is to hold such values as body constraint information, then it must also hold information regarding projection angle.

This concludes this description of examples of other body constraint information used for part region estimation.

Upon completion of part region estimation, part region estimation section 130 outputs as part region data to part candidate extraction section 140, with respect to all pixels of the entire image of the image data, information indicating whether or not each pixel is a part region for a part.

The part region data may have a structure where there is laid out, for example, pixel information Kij indicating, with respect to all pixel positions (i, j) in the image data, whether or not there is a corresponding part region of a part. Each element in pixel information Kij may, for example, assume a value of "1" if it belongs to a part region of a corresponding part, or "0" if not. For pixel information Kij, there are as many dimensions as there are parts, for example, as in Kij=[k1, k2]. In this case, k1 may correspond to the part region of the right upper arm, and k2 to the part region of the right forearm.

By way of example, if part region estimation section 130 determines that some pixel position Kab is included in the part region of the right upper arm but not in the part region of the right forearm, pixel information Kab=[1, 0] is generated. Part region estimation section 130 generates as part region data the thus generated set of pixel information for each pixel.

How part regions are to be represented by part region data is by no means limited to the example provided above. By way of example, part region data may indicate, for each part region pre-defined in the image, which part's part region it corresponds to, or it may indicate, for each part, the coordinates of the perimeter of the part region.

If normalized reference part positions are to be used in the reference part estimation process, it is preferable that the part region correspondence table include a part region corresponding to the normalized reference parts. As in the case of the reference part correspondence table discussed hereinabove, part region data may also include other information such as right shoulder position RS, left shoulder position LS, and/or the like. Part region estimation section 130 derives the part region of each part by computing parameters corresponding to the parameters included in the part region correspondence table.

Figure 12:
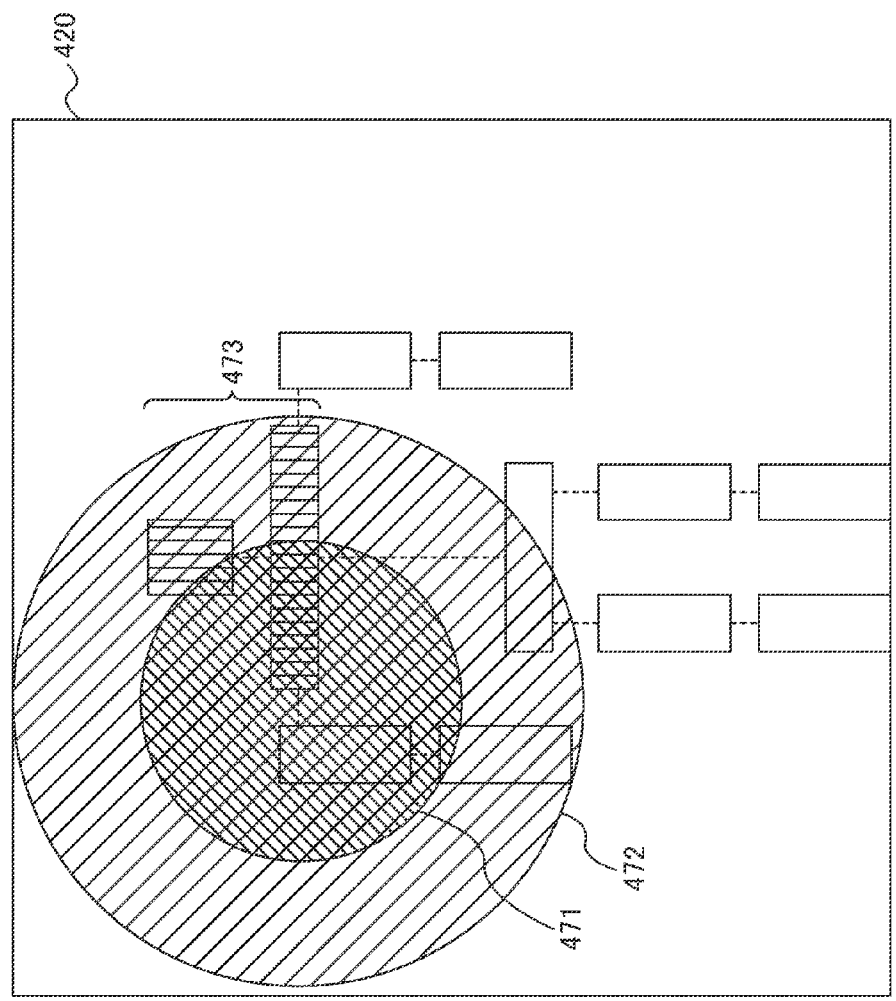
FIG. 12 is a diagram showing example contents of part region data with respect to Embodiment 1.

FIG. 12 is a diagram showing example contents of part region data. For purposes of convenience, the position of each part with respect to a case of an upright standing state is also shown in the drawing.

As shown in FIG. 12, the part region data indicates, with respect to image 420 of the image data, part region 471 of the right upper arm, and part region 472 of the right forearm. These part regions 471 and 472 are estimated with reference to the already estimated positions and orientation of reference parts 473 as mentioned above.

Part region estimation section 130 thus estimates the part region of each part using body constraint information. This concludes this description of a part region estimation process.

Next, in step S1400 in FIG. 4, part candidate extraction section 140 performs a process of computing a likelihood value with respect to the part region of each part and thus generating an estimated likelihood map (hereinafter referred to as "estimated likelihood map generation process").

A first example of the details of an estimated likelihood map generation process will now be described.

Part candidate extraction section 140 first identifies, from the image data and for each pixel within the part region of each part, image features suited for representing the position and orientation states of the part, and computes a likelihood value indicating the likelihood that the part is located thereat. Part candidate extraction section 140 then generates an estimated likelihood map indicating a distribution of likelihood values for the pixels using the likelihood values computed from the image data. The likelihood values may be values normalized to fall within the range of 0 to 1, as well as real numbers including positive integers and negative numbers.

For the method of recognizing an object of interest within the image, one may employ a technique involving: creating strong classifiers by combining the sums of a plurality of weak classifiers based on rectangular information through AdaBoost; combining the strong classifiers in a cascade; and recognizing a face as an object of interest within the image, for example. For the image features, scale-invariant feature transform (SIFT) features may be employed (e.g., see NPL 1), for example. SIFT features are configured with 128-dimensional vectors, and are values that are computed for each pixel. Because SIFT features are unaffected by scale changes, rotation, or translation of the object to be detected, they are particularly effective for detecting parts that are rotatable in various directions, e.g., the arms. In other words, SIFT features are suited for the present embodiment which defines posture states through the relative joint positions and angles of two or more parts.

When a method using SIFT features is applied to the present embodiment, strong classifiers Hk (where k=1, 2) are generated for each part region in advance through machine learning, and stored in part candidate extraction section 140, as in right upper arm (k=1), right forearm (k=2), and so forth. Classifiers Hk are generated by an AdaBoost algorithm. In other words, strong classifiers Hk are generated by: repeating learning until it is made possible to determine, with the desired level of accuracy, whether or not a plurality of training images prepared in advance for each part are the right upper arm and whether or not they are the right forearm; and connecting a plurality of weak classifiers in a cascade.

Upon computing an image feature for each part and each pixel, part candidate extraction section 140 inputs the image features to strong classifiers Hk, and computes the sum of values obtained by multiplying the output of each weak classifier forming the strong classifiers Hk by reliability α pre-obtained for each weak classifier. Part candidate extraction section 140 then subtracts predetermined threshold Th from the computed sum to compute likelihood value ck for each part and each pixel. For the present case, c1 represents a likelihood value for the right upper arm, and c2 a likelihood value for the right forearm.

Part candidate extraction section 140 expresses likelihood values Cij of the respective pixels, where the likelihood values of the respective parts are combined, as Cij=[c1, c2]. Part candidate extraction section 140 then outputs to posture state estimation section 150 as an estimated likelihood map the likelihood values Cij of all the pixels in the entire image.

For each pixel, part candidate extraction section 140 determines whether or not the pixel is included in any part region. If it is included, a likelihood value is computed using the classifier for that part, and if not, the likelihood value for that part may be set to 0. In other words, part candidate extraction section 140 may compute the products of determinant (Kij) of pixel information outputted from part region estimation section 130 and determinant (Cij) of likelihood values of the respective pixels computed irrespective of the part regions, and take the results thereof to be the final estimated likelihood map.

Figure 13:
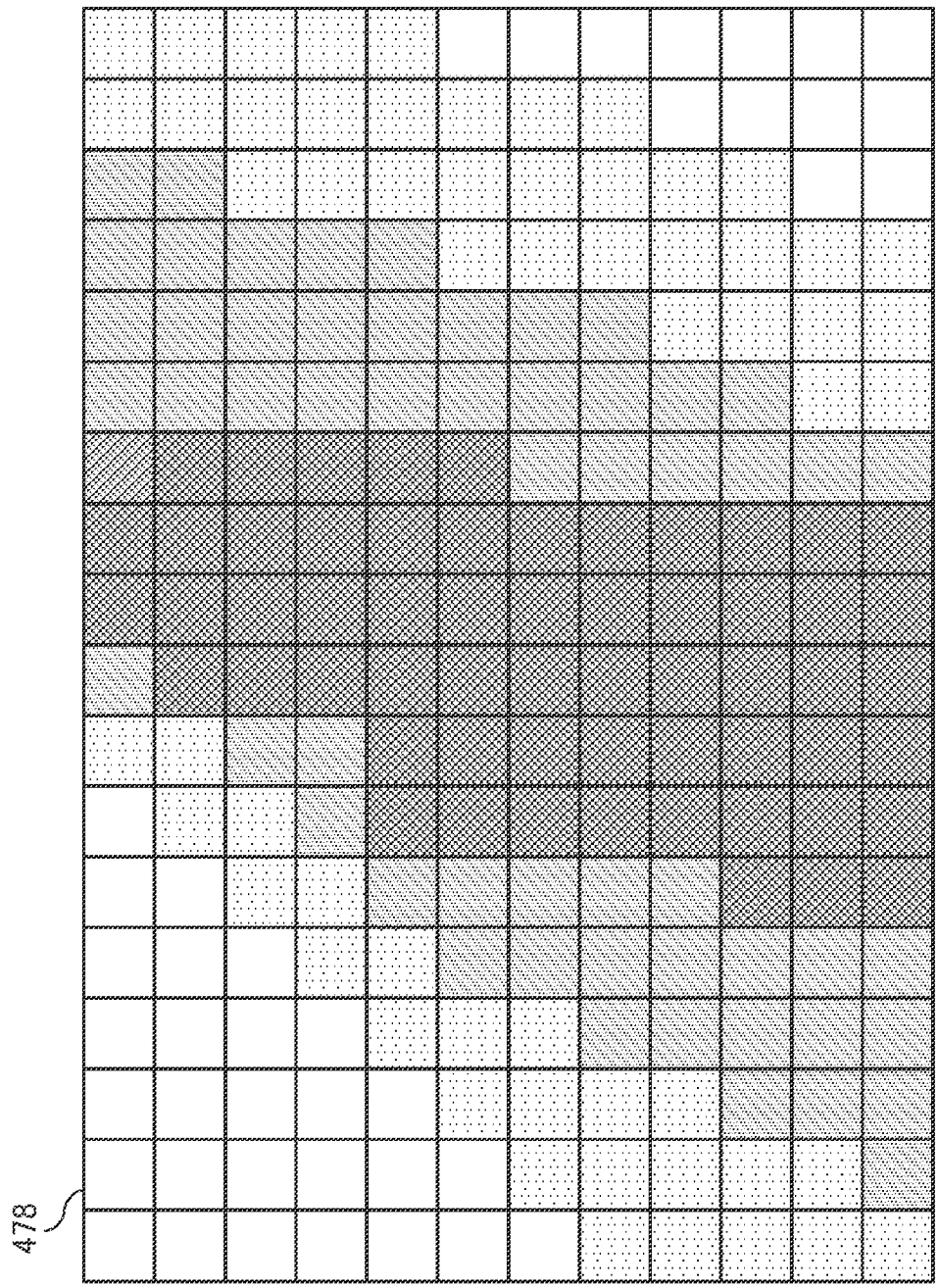
FIG. 13 is a diagram showing an example of an estimated likelihood map with respect to Embodiment 1.

FIG. 13 is a diagram showing an example of an estimated likelihood map. Here, the likelihood values of just one part (e.g., the right upper arm) in an estimated likelihood map are shown, where pixels with higher likelihood values are shown with darker shadings. As shown in FIG. 13, estimated likelihood map 478 represents a distribution of likelihoods regarding part presence.

With respect to the information for each pixel in the likelihood map, for example, the likelihood value for part k is denoted by ck, where, if there are n parts, the data structure would be such that likelihood vector Cij=[c1, c2 . . . , ck . . . , cn].

Part candidate extraction section 140 thus generates an estimated likelihood map. This concludes this description of a first example of the details of an estimated likelihood map generation process.

A second example of the details of an estimated likelihood map generation process will now be described.

Part candidate extraction section 140 generates, for example, an estimated likelihood map by extracting parallel lines from edges contained in the image data.

In this case, part candidate extraction section 140 extracts parallel lines by referencing a correspondence table that maps shoulder joint lengths to standard thickness values for various parts, the correspondence table being pre-stored in body constraint information storage section 110 as one form of body constraint information, for example. Part candidate extraction section 140 searches a part region for a pair of parallel lines spaced apart by a distance corresponding to the standard thickness for that part while rotating the direction of determination by 360°. Part candidate extraction section 140 repeats a process where, if there is a matching parallel line pair, a vote is cast for each pixel in the region enclosed by those parallel lines, and generates an estimated likelihood map based on the final number of votes for each pixel.

With such a method, the estimated likelihood map and the learned likelihood maps would include, for each pixel and each part, directions of parallel lines and numbers of votes (hereinafter referred to as "directional likelihood values"). By way of example, assuming that parallel line angles are divided into eight categories, the likelihood value of each pixel and each part would assume an eight-dimensional value corresponding to those eight directions. By way of example, further assuming that parallel line widths are divided into two categories, the likelihood value of each pixel and each part would assume a sixteen-dimensional (2×8=16) value. The parallel line distance or angle to be voted on may vary from part to part. By computing a plurality of parallel line widths and using the likelihood value of the width with the highest likelihood value, likelihood may be computed while absorbing differences in body type and clothing.

Part candidate extraction section 140 then determines, for each part, that the direction with the highest directional likelihood value is the main edge direction for that part, for example. In so doing, posture state estimation section 150 may compute the sum of likelihood values for all pixels for each direction, and determine the direction with the highest sum to be the direction with the highest directional likelihood value.

Part candidate extraction section 140 thus generates an estimated likelihood map using body constraint information. This concludes this description of a second example of the details of an estimated likelihood map generation process.

Next, in step S1500, posture state estimation section 150 performs a match level determination process in which it is determined whether or not the estimated likelihood map matches with any learned likelihood map, on the basis of whether or not the level of match therebetween is of a predetermined level or greater.

An example of the details of a match level determination process will now be described. A first example of the details of a match level determination process corresponding to a case where the first example of the estimated likelihood map generation process discussed above is adopted will be described first.

Posture state estimation section 150 first performs thresholding on the estimated likelihood map and each learned likelihood map using their respective predetermined thresholds. Specifically, posture state estimation section 150 converts the likelihood value of each pixel and each part to a digital signal of "1" if it is equal to or greater than the predetermined threshold, or to a digital signal of "0" if it is less than the predetermined threshold.

Figure 14:
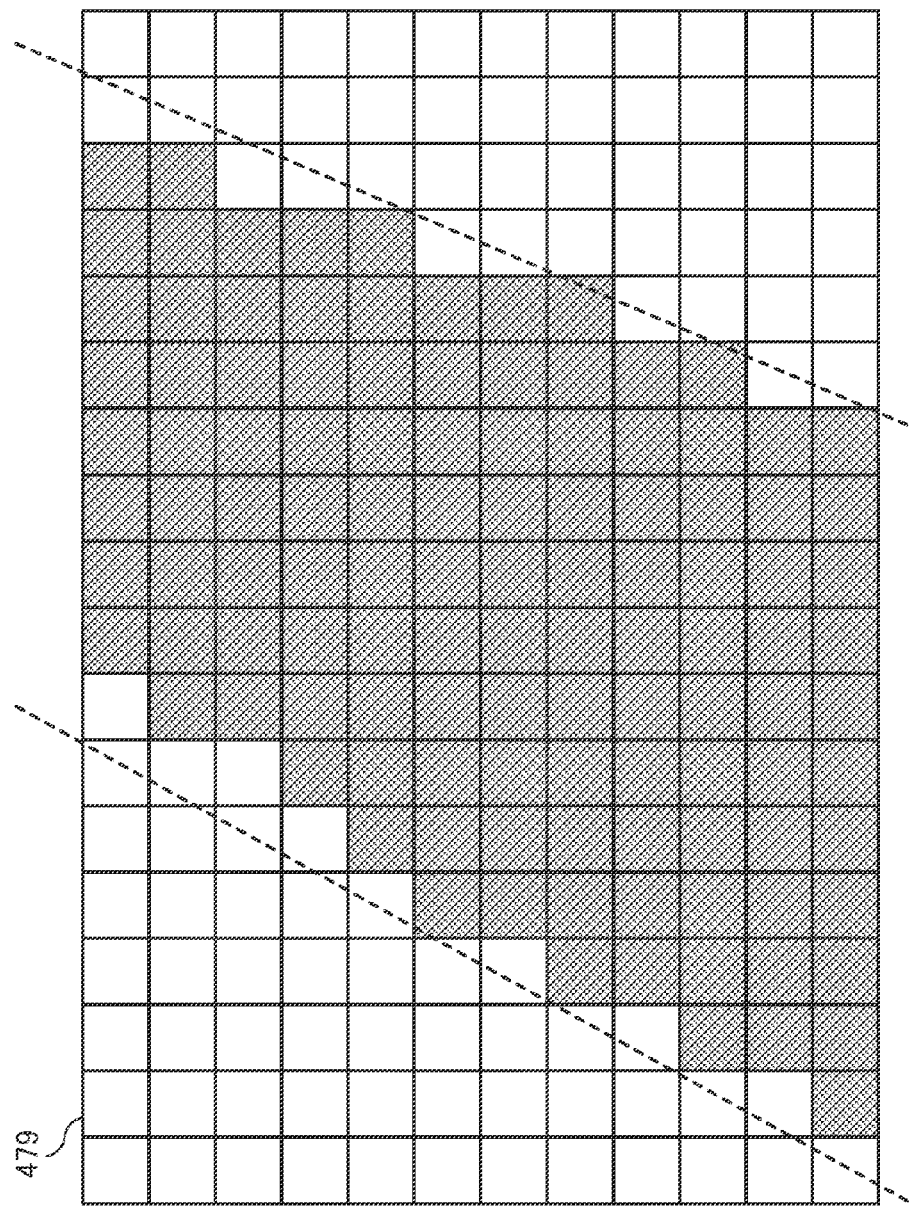
FIG. 14 is a diagram showing an example of an estimated likelihood map after thresholding with respect to Embodiment 1.

FIG. 14 is a diagram showing an example of a post-thresholding state of the estimated likelihood map shown in FIG. 13. Here, pixels with a digital signal of "1" are shown in grey, and pixels with a digital signal of "0" in white. As shown in FIG. 14, thresholded estimated likelihood map 479 represents a distribution of portions where a part is likely located.

For each learned likelihood map, posture state estimation section 150 then computes the products of the thresholded likelihood values for each pixel and each part between the estimated likelihood map and the learned likelihood map, and takes the sum of the values for all pixels and all parts to be an evaluation value. Specifically, posture state estimation section 150 overlays the estimated likelihood map and the learned likelihood map on top of each other in a predetermined positional relationship, multiplies their thresholded likelihood value information with each other pixel by pixel, and computes the sum of the products for all pixels and parts.

Posture state estimation section 150 shifts the positional relationship for overlaying the estimated likelihood map and the learned likelihood map through translation and rotation, and performs the above-mentioned computation processes for each positional relationship. Posture state estimation section 150 then obtains the largest value among the computed evaluation values and takes it to be the final evaluation value representing the level of match with respect to the learned likelihood map. If there exists a learned likelihood map for which this evaluation value is equal to or greater than a predetermined threshold, posture state estimation section 150 determines that this learned likelihood map and the estimated likelihood map are a match. The threshold is pre-set to an appropriate value through learning, and/or the like.

Posture state estimation section 150 does not necessarily have to perform thresholding on the estimated likelihood map and the learned likelihood maps. In this case, posture state estimation section 150 would be able to determine with greater precision the levels of match between the learned likelihood maps and the estimated likelihood map. If thresholding is performed, however, posture state estimation section 150 would be able to determine the level of match quickly.

Posture state estimation section 150 thus determines the level of match between estimated likelihood maps and learned likelihood maps. This concludes this description of a first example of a match level determination process.

A second example of the details of a match level determination process corresponding to a case where the above-mentioned second example of an estimated likelihood map generation process is adopted will now be described.

For each part, posture state estimation section 150 overlays the estimated likelihood map and a learned likelihood map on top of each other in such a manner that key edge directions coincide therebetween, and computes the level of match. Subsequent processes are comparable to those in the above-mentioned first example.

A method that thus takes edge directions into account makes it possible to place constraints on the positional relationship for overlaying the estimated likelihood map and a learned likelihood map on top of each other, thereby enabling a reduction in processing load.

In computing the level of match between the estimated likelihood map and a learned likelihood map, posture state estimation section 150 may also use just the edge direction information. In this case, for example, posture state estimation section 150 takes the level of match with respect to angles formed between edge directions of a plurality of specified parts to be an evaluation value representing the level of match between the estimated likelihood map and a learned likelihood map. If the evaluation value falls within a predetermined range, posture state estimation section 150 then determines that the posture of the subject is in the posture state corresponding to the learned likelihood map in question.

A method that thus determines level of match using edge directions alone renders unnecessary the process of repeatedly computing a plurality of evaluation values while rotating the image, and is thus capable of further reducing the processing load. This concludes this description of a second example of a match level determination process.

If the learned likelihood map matches the estimated likelihood map (S1500: YES), posture state estimation section 150 proceeds to step S1600. If the learned likelihood maps do not match the estimated likelihood map (S1500: NO), posture state estimation section 150 proceeds to step S1700.

In step S1600, posture state estimation section 150 notifies the user, via information output apparatus 300, of the posture state corresponding to the learned likelihood map that matches the estimated likelihood map, and proceeds to step S1700.

In step S1700, joint angle extraction section 161 extracts the joint angle of each joint of the subject on the basis of the part candidates outputted from part candidate extraction section 140.

Specifically, first, joint angle extraction section 161 extracts the direction of the part axis (the angle; hereinafter referred to as "axis direction") of each part from the part candidates. If, for example, the outline of the part indicated by a part candidate can be approximated with an ellipse, joint angle extraction section 161 takes the long axis of that ellipse to be the part axis. Further, joint angle extraction section 161 may also approximate with an ellipse a region where the average value of the likelihood values for the pixels in that region exceeds a predetermined threshold, and take the long axis of that ellipse to be the part axis. Further, if the part candidate contains directional components, joint angle extraction section 161 may also take the parallel component most frequently found in the part candidate to be the axial direction of the part, and take a straight line passing through the geometric center of a region containing pixels for which the likelihood values in the axial direction are equal to or greater than a predetermined threshold to be the part axis.

Then, joint angle extraction section 161 computes, for each joint, the joint angle of that joint from the axis directions of two parts that sandwich that joint. Then, joint angle extraction section 161 outputs the position and axis direction of the part axis to joint position extraction section 162 together with the identifier (ID) of the part to which that part axis corresponds. Joint angle extraction section 161 also outputs the joint angle to reference ratio joint position acquisition section 164 together with the ID of the joint to which that joint angle corresponds.

Then, in step S1800, joint position extraction section 162 estimates the joint position of each joint from the received position and axis direction of the part axis. Specifically, joint position extraction section 162 obtains, for each part, the position of the point of intersection between part axes, and takes the obtained position to be the joint position of the corresponding joint. Then, joint position extraction section 162 outputs the obtained joint position (in other words, the extracted joint position) to part length ratio estimation section 165 together with its ID.

In step S1900, reference ratio joint position acquisition section 164 extracts the joint position of each of the joints corresponding to the received joint IDs, with reference to the reference model information in reference ratio posture DB 163. Then, reference ratio joint position acquisition section 164 outputs the obtained joint position (in other words, the reference ratio joint position) to part length ratio estimation section 165 together with its ID.

More specifically, first, reference ratio joint position acquisition section 164 searches for reference model information in which the image posture state coincides with the posture state in the subject image, on the basis of the sets of the joint angle and the joint ID received from joint angle extraction section 161. That is, reference ratio joint position acquisition section 164 searches for an image posture state in which the angles of joints in the image are close, and extracts the position of each joint of the reference model in that image posture state as the reference ratio joint position. Then, reference ratio joint position acquisition section 164 outputs the extracted reference ratio joint position of each joint to part length ratio estimation section 165 together with the identifier (ID) of its corresponding joint.

Example details of the reference model information will now be described.

The reference model information, for example, contains: first-stage information in which the joint position and the like are expressed for each posture state using a three-dimensional coordinate system (hereinafter referred to as "reference model three-dimensional information"); and second-stage information in which the joint position and the like in each posture state as viewed from a given perspective are expressed using a two-dimensional coordinate system (hereinafter referred to as "reference model two-dimensional information"). The first-stage information is hereinafter referred to as "reference model three-dimensional information", and the second-stage information is hereinafter referred to as "reference model two-dimensional information". In this case, the reference model two-dimensional information can be obtained by projecting reference model one-dimensional information in a two-dimensional coordinate system. If it is assumed that a reference model in one posture state is viewed from a plurality of perspectives, a plurality of pieces of reference model two-dimensional information may be generated from one piece of reference model three-dimensional information. The plurality of perspectives assumed here correspond to that a plurality of combinations of the position and orientation of the reference model exist for the perspective of a camera.

The three-dimensional information will first be described.

The reference model three-dimensional information is expressed using a predetermined three-dimensional coordinate system in which: the joint position of the right shoulder joint is taken to be the origin; and the distance between the right shoulder position and the left shoulder position is taken to be 1. Note that the reference model three-dimensional information may be expressed using a coordinate system in which another position is taken to be the original or a coordinate system in which another length such as the part length of the arms or the body height is taken to be 1.

It is assumed here, for example, that the posture ID for the posture state is "200", that the joint ID for the right shoulder is "100", that the part ID for the shoulders is "1", and that the part ID for the right upper arm is "3". It is also assumed that the movable directions of the right upper arm are (20.0) with respect to the X-axis, (90.0) with respect to the Y-axis, and (0.0) with respect to the Z-axis. In this case, the reference model three-dimensional information may specify the freedom of the right upper arm of the reference model with respect to the right shoulder joint by a file or program source written as follows, for example. Note that the reason why the movable directions in the reference model three-dimensional information are given in the form of not a range but one direction unlike the body constraint information is that the reference model three-dimensional information is information of each posture state. The movable directions in the reference model three-dimensional information however may be defined in the form of a range, in consideration of an error and individual variability of the joint angle.

```
Three-dimensional posture Begin
    Posture ID: 200
    Joint Begin
        Joint ID: 100
        Part ID: 1
        Part ID: 3
        Movable directions: rx, ry, rz
        Angle: 20.0, 90.0, 0.0
        Position: (0, 0, 0)
    Joint End
Three-dimensional posture End
```

Note that, for the reference model three-dimensional information, information regarding joints and information regarding parts may be written in separate files. As a result, the files can be shared among a plurality of posture states, so that the size of reference ratio posture DB 163 can be reduced.

For the reference model three-dimensional information, the correspondence relation between joint positions and posture states and the correspondence relation between joint angles and posture states may be written in separate files. As a result, in the case of preparing pieces of reference model three-dimensional information on a plurality of reference models having different body types, a file in which the correspondence relation between joint angles and posture states is written can be a common file, so that the size of reference ratio posture DB 163 can be reduced.

For the reference model three-dimensional information, the joint angle of each joint, the part length, the part thickness, and the like are written, and writing of the joint position may be omitted. In this case, the joint position can be computed from the joint angle and the body constraint. As a result, the size of reference ratio posture DB 163 can be reduced.

For example, the reference model three-dimensional information regarding the right upper arm can be dividedly written as follows.

```
Three-dimensional posture definition Begin
    Posture ID: 200
    Joint Begin
        Joint ID: 100
        Part ID: 1
        Part ID: 3
        Movable directions: rx, ry, rz
    Joint End
Three-dimensional posture definition End
Three-dimensional posture angle Begin
    Posture ID: 200
    Joint Begin
        Joint ID: 100
        Angle: 20.0, 90.0, 0.0
    Joint End
Three-dimensional posture angle End
Three-dimensional posture position Begin
    Posture ID: 200
    Joint Begin
        Joint ID: 100
        Position: (0, 0, 0)
    Joint End
Three-dimensional posture position End
```

For the reference model three-dimensional information, pieces of information regarding a plurality of joints may be put together in one file as follows. Note that, in this case, the angle and the position may be expressed using a predetermined three-dimensional coordinate system in which one reference point such as the right shoulder joint position is taken to be the original. Alternatively, the angle and the position may be expressed using a relative three-dimensional coordinate system in which the joint position closer to the torso and the axis direction of another part closer to the torso are taken to be references.

```
Three-dimensional posture Begin
    Posture ID: 200
    Joint Begin
        Joint ID: 100
        Part ID: 1
        Part ID: 3
        Movable directions: rx, ry, rz
        Angle: 20.0, 90.0, 0.0
        Position: (0, 0, 0)
    Joint End
    Joint Begin
    ...
    Joint End
Three-dimensional posture End
...
Three-dimensional posture Begin
    Posture ID: 300
    Joint Begin
    ...
    Joint End
    Joint Begin
    ...
    Joint End
Three-dimensional posture End
```

Note that, even in the case where pieces of information regarding a plurality of joints are put together in one file in this way, the reference model three-dimensional information may be written in separate files for each information type as described above.

For the reference model three-dimensional information, pieces of information regarding a plurality of posture states may be similarly put together in one file.

Next, the reference model two-dimensional information will be described.

The reference model two-dimensional information is generated on the basis of the reference model three-dimensional information. The reference model two-dimensional information may be generated in advance and stored in reference ratio posture DB 163, and may be generated from the reference model three-dimensional information each time. In the case of assuming a plurality of perspectives, if the reference model two-dimensional information is generated each time, the size of reference ratio posture DB 163 can be reduced. The reference model two-dimensional information is generated by, for example, reference ratio posture DB 163 or reference ratio joint position acquisition section 164. Note that information indicating how many pixels in the image the length of a part as the reference corresponds to is added to the reference model two-dimensional information.

It is assumed, for example, that the horizontal angle of projection in two-dimensional coordinates is "90 degrees", that the vertical angle thereof is "45 degrees", that the part as the reference is shoulders, and that the shoulder length (the distance from the right shoulder joint position to the left shoulder joint position) is "20 pixels". In this case, the reference model two-dimensional information regarding the right upper arm can be written as follows. It is assumed, in the two-dimensional coordinate system here, that the horizontal direction in the image is the x-axis, that the vertical direction therein is the y-axis, and that the right shoulder joint position is the original. It is also assumed that the angle is an angle to the x-axis. Note that the projection angle is used to, for example, narrow the reference model two-dimensional information on the basis of the installation angle of monocular camera 200.

```
Two-dimensional posture Begin
    Posture ID: 200
    Length conversion of part as reference: 20
    Projection Begin
        Projection angle: (90, 45)
        Joint Begin
            Joint ID: 100
            Part ID: 1
            Part ID: 3
            Angle: 10.0
            Position: (0, 0)
        Joint End
    Projection End
Two-dimensional posture End
```

Note that the reference model two-dimensional information may be written in separate files for each image posture state or for each information type, similarly to the reference model three-dimensional information described above.

As described below, the reference model two-dimensional information may contain pieces of information regarding a plurality of joints with respect to one projection angle, and may contain pieces of information regarding a plurality of projection angles with respect to one posture.

```
Two-dimensional posture Begin
    Posture ID: 200
    Length conversion of part as reference: 20
    Projection Begin
        Projection angle: (90, 45)
        Joint Begin
            Joint ID: 100
            Part ID: 1
            Part ID: 3
            Angle: 10.0
            Position: (0, 0)
        Joint End
        ...
        Joint Begin
        ...
        Joint End
    Projection End
    Projection Begin
        Projection angle: (70, 45)
        Joint Begin
        ...
        Joint End
    Projection End
    ...
Two-dimensional posture End
```

Note that, even in the case where the reference model two-dimensional information contains pieces of information regarding a plurality of projection angles with respect to one posture, the reference model two-dimensional information may be written in separate files for each image posture state or for each information type, similarly to the reference model three-dimensional information described above. As a result, the size of reference ratio posture DB 163 can be reduced.

The projection angle of the reference model three-dimensional information in the two-dimensional coordinate system may be a fixed value, and may be a value that changes in accordance with the computed orientation of the shoulders. In the latter case, reference ratio joint position acquisition section 164 needs to acquire the orientation of the shoulders extracted by part candidate extraction section 140. Further, reference ratio joint position acquisition section 164 may include such a projection angle setting/processing section that sets the projection angle to a given value.

This concludes this description of the example details of the reference model information.

Next, in step S2000 in FIG. 4, part length ratio estimation section 165 computes the part length of each part determined by the received extracted joint position and the part length of each part determined by the received reference ratio joint position. Then, part length ratio estimation section 165 computes, for each part, the ratio of: the part length determined by the extracted joint position; to the part length determined by the reference ratio joint position. That is, part length ratio estimation section 165 computes, for each part, the ratio of: the part length of the subject extracted from the image data; to the part length of the reference model.

A specific example of the method of computing the part length ratio will now be described.

Figure 15:
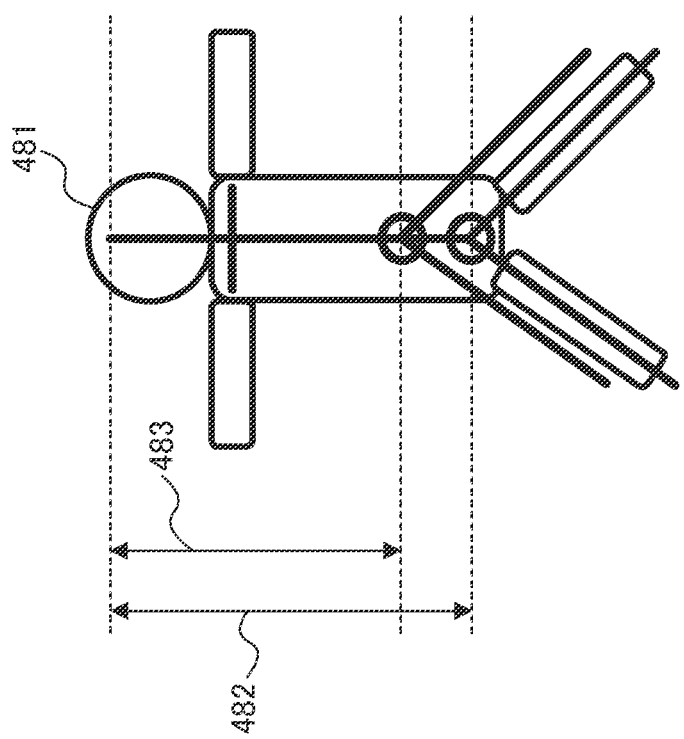
FIG. 15 shows a relation example between a reference model and a subject according to Embodiment 1.

FIG. 15 shows a relation example between a reference model and a subject in the same image posture state.

For example, there is a case as shown in FIG. 15 where length l of the part axis of the portion from the head to the waist of subject 481 is longer than length lc of the part axis of the portion from the head to the waist of reference model 482. In such a case, as is apparent from FIG. 15, the position of the legs with respect to the head is different between subject 481 and reference model 482, even if the length and angle of the legs are the same.

Such part difference leads to a decrease in accuracy of each of part region estimation, part candidate estimation, and posture state estimation.

Meanwhile, for the same joint, the level of match between the joint angle extracted from the image data and the joint angle in the extracted image posture state should be high, and hence the part axes connected to that joint are substantially parallel to each other as shown in FIG. 15.

Accordingly, in step S2100 in FIG. 4, part length ratio estimation section 165 performs, on the body constraint information, a correction equivalent to such expansion or contraction that matches the part length of reference model 482 defined by the body constraint information with the part length of subject 481.

In the example of FIG. 15, for example, part length ratio estimation section 165 expands downward the part length of the portion from the head to the waist of reference model 482, to thereby match reference model 482 with subject 481 in terms of the position of the legs. As a result, the accuracy of each of part region estimation, part candidate estimation, and posture state estimation can be improved.

Specifically, for example, part length ratio estimation section 165 computes part length ratio $r_m$ of the $m^{th}$ part according to the following Equation 1, with the use of part length $l_m$ of the $m^{th}$ part of the subject and part length $lc_m$ of the $m^{th}$ part of the reference model.

$$r_m = l_m/lc_m \qquad \text{(Equation 1)}$$

Then, part length ratio estimation section 165 corrects the body constraint information in body constraint information storage section 110 on the basis of each part length ratio $r_m$. That is, part length ratio estimation section 165 corrects the body constraint information such that each part length $lc_m$ indicated by the body constraint information matches with a value obtained by multiplying its current value by corresponding part length ratio $r_m$. Specifically, part length ratio estimation section 165 corrects, for example, the radius of the circle in part region 464 written in part region correspondence table 460 (see FIG. 11) to a value obtained by multiplying the radius in the reference model by the part length ratio.

It is desirable that part length ratio estimation section 165 also perform a correction having contents corresponding to the correction performed on the body constraint information, on the reference model information in reference ratio posture DB 163. This can complete the correction of the body constraint information in its first process, while the subject is the same.

Note that part length ratio estimation section 165 may correct the body constraint information in body constraint information storage section 110 using computed part length $l_m$ of the subject without any change. In some cases, however, the two-dimensional coordinate system that expresses parameters corresponding to part lengths of the body constraint information may not match with the two-dimensional coordinate system of the reference model two-dimensional information, and parameters corresponding to part lengths of the body constraint information may be values in the three-dimensional coordinate system. In these cases, part length ratio $r_m$ is more suitable for computation than part length $l_m$ that is a length in the two-dimensional coordinate system.

In step S2200, part region estimation section 130 determines whether or not there has been an instruction, through user operation and/or the like, to terminate processing. If there has not been any instruction to terminate processing (S2200: NO), part region estimation section 130 returns to step S1100, and proceeds to process the next still image. If there has been an instruction to terminate processing (S2200: YES), part region estimation section 130 terminates the sequence of processing.

Through such an operation, because object detection apparatus 100 extracts the angle of each joint of the subject from the image data, and estimates therefrom the part length ratio of each part of the subject, the accuracy of posture state estimation can be improved.

Note that posture state estimation section 150 may estimate the posture state and may output the estimation result, after the elapse of a time that is long enough for the contents of the body constraint information to match with the body type of the subject. As a result, the reliability of the estimation result of the posture state estimation can be improved.

Part length ratio estimation section 165 may correct the body constraint information using an average value of part length ratios obtained from image data of several frames. As a result, the robustness of posture state estimation with respect to fluctuations of information extracted from each piece of the image data can be improved.

Part length ratio estimation section 165 may correct the body constraint information using only the part length ratio obtained when the subject is in a particular posture state that enables accurate detection of the part length. As a result, the accuracy of posture state estimation can be further improved.

As described above, because object detection apparatus 100 according to the present embodiment extracts the angle of each joint of the subject from the image data, and estimates therefrom the part length ratio of each part of the subject, information regarding a person in the image data can be accurately detected from the image data.

Because object detection apparatus 100 can correct the body constraint information used for posture state estimation such that the body constraint information matches with the body type and the posture, on the basis of the part length ratio of the subject, influences of individual variability of the body type and a difference in posture on posture state estimation can be suppressed. As a result, object detection apparatus 100 can perform accurate posture state estimation without the need to prepare in advance special reference models such as a model having an average body type and a model having a body type for each subject.

Object detection apparatus 100 may also be arranged to perform estimation only with respect to a given posture state that has been explicitly specified, and output an estimation result as to whether or not the specified posture state is assumed.

Furthermore, the image data used for object detection may also be data of images captured by a stereo camera or a plurality of cameras. When using image data of a stereo camera, object detection apparatus 100 may use image data captured by one of the cameras and position information of the subject as derived from the installation parameters of the stereo camera. Furthermore, when using image data of a plurality of cameras, object detection apparatus 100 may use image data captured by one of those cameras, and position information of the subject as derived from the installation parameters of each camera.

Furthermore, if the positions and orientation of the reference parts are known or specified, part region estimation section 130 need not perform the above-mentioned reference part estimation process. If, for example, the direction in which a person walks is fixed, and the orientation of the reference parts is generally uniform, part region estimation section 130 may hold body orientation information.

Furthermore, the part region estimation method performed by part region estimation section 130 is by no means limited to the examples provided above. By way of example, part region estimation section 130 may extract edge portions (hereinafter simply referred to as "edges") of an image from the image data, and estimate each part region based on the range of Y-coordinate values in the region enclosed by the edges. Specifically, for example, part region estimation section 130 may estimate, in the region enclosed by the edges, 20% of the region starting from the position where the Y-coordinate value is greatest to be a part region for the head. Similarly, for example, part region estimation section 130 may estimate the region from 15% to 65% to be a part region for the torso, the region from 55% to 85% to be a part region for the thighs, and the region from 75% to 100% to be a part region for the crura. In this case, values corresponding to the percentages of the various regions serve as body constraint information.

Furthermore, part region estimation section 130 may extract a moving body by computing background differences between images in the original video data, and take an entire region including the extracted region to be a part region candidate for each part. This expedites processing in estimating part regions.

Furthermore, object detection apparatus 100 may estimate the part region of each part of interest by repeating a process where part positions are estimated one by one in order of increasing distance from the reference parts, and where the part region of the next part is estimated based on the estimated position.

Object detection apparatus 100 does not necessarily have to perform part region estimation. In this case, part candidate extraction section 140 would compute likelihood values uniformly for all regions in the image.

In the case where a learned likelihood map is mapped to information regarding the optical axis direction of the image from which that learned likelihood map originated, posture state estimation section 150 may make comparisons using the learned likelihood map corresponding to installation angle θ of monocular camera 200.

Furthermore, the posture state estimation method performed by posture state estimation section 150 is by no means limited to the examples provided above. By way of example, posture state estimation section 150 may also perform posture state estimation using not the learned likelihood map but the reference model information in reference ratio posture DB 163.

If the subject is identifiable by a wireless tag and/or the like, object detection apparatus 100 may hold body constraint information for each subject, and perform processes such as posture estimation and body constraint information correction. As a result, object detection apparatus 100 can deal with the case where a plurality of subjects are included in one screen. Further, when the same subject is detected more than once, high accuracy can be obtained faster from the second time.

Object detection apparatus 100 may perform posture state estimation of the subject on the basis of the joint position.

One example of the posture state estimation based on the joint position will be now described.

On the basis of the joint angle received from joint angle extraction section 161, reference ratio joint position acquisition section 164 extracts a plurality of image posture states having a joint angle close thereto, as candidates of the image posture state of the subject.

Then, reference ratio joint position acquisition section 164 matches the joint position of one joint serving as the reference of each image posture state with the joint position of the same joint estimated from the subject.

The specific procedures are as follows. It is assumed here that the right shoulder joint is the joint serving as the reference, the joint position of the right shoulder joint of the subject is (xa, ya), and that the position of the right shoulder joint in the $p^{th}$ image posture state is $(xb_p, yb_p)$. In this case, reference ratio joint position acquisition section 164 translates each joint position in the $p^{th}$ image posture state by $(xa-xb_p, ya-yb_p)$.

Then, reference ratio joint position acquisition section 164 computes part length ratio $r_p$ of the part serving as the reference (for example, shoulders) in the $p^{th}$ image posture state, similarly to part length ratio estimation section 165. That is, part length ratio $r_p$ is a value representing the ratio of the body type.

Note that the joint position estimated from the subject is obtained from, for example, the part candidates extracted by part candidate extraction section 140.

Then, reference ratio joint position acquisition section 164 matches the body type of the reference model in each image posture state with the body type of the subject, with the use of computed part length ratio $r_p$.

The specific procedures are as follows. Assuming that the joint position before the translation, of the $q^{th}$ joint in the $p^{th}$ image posture state is $(x_{pq}, y_{pq})$, reference ratio joint position acquisition section 164 computes each joint position $(x_{pq}', y_{pq}')$ after the body type matching according to, for example, the following Equation 2.

$$(x_{pq}', y_{pq}') = (\{x_{pq} - xa + xb_p\}r_p, \{y_{pq} - ya + yb_p\}r_p) \quad \text{(Equation 2)}$$

Then, reference ratio joint position acquisition section 164 computes the position, axis direction, and part length of each part for each image posture state, with the use of each joint position $(x_{pq}', y_{pg}')$ after the body type matching.

Then, reference ratio joint position acquisition section 164 obtains, for each part, the sum of likelihood values for the pixels including the part axis of that part. The likelihood values are, for example, values of the estimated likelihood map described above. Alternatively, reference ratio joint position acquisition section 164 may use the sum of likelihood values for regions in which the distance from the part axis falls within a predetermined range, and may use the sum of likelihood values for elliptical regions each having the part axis as the long axis.

Then, reference ratio joint position acquisition section 164 identifies an image posture state having the largest sum of likelihood values for all the parts, as the image posture state of the subject. The reference model two-dimensional information corresponding to the identified image posture state indicates the joint position of the subject in the image. Further, the reference model three-dimensional information from which that reference model two-dimensional information originated indicates the joint position of the subject in the three-dimensional coordinate system.

This concludes this description of the posture state estimation based on the joint position.

Object detection apparatus 100 may output the posture state estimated on the basis of only the joint angle, as the object detection result. In this case, object detection apparatus 100 outputs, for example, the posture state estimated by reference ratio joint position acquisition section 164, as the posture state of the subject. In this case, if the joint angle of the subject can be acquired as an angle in a three-dimensional space, object detection apparatus 100 may estimate the image posture state and make joint position comparison, with the use of the joint angle of each joint in the three-dimensional space. As a result, the reference model information can have contents in which only the joint angle is written for each posture state.

The present invention is not limitatively applied to posture state estimation of a person. The present invention can also be applied to, for example, detection of the body type of the subject, detection of attributes such as age, sex, and race based on the body type, and detection of the posture states of various objects (such as a robot) having a plurality of parts articulated by joints.

An example of performing posture estimation using an irregularity map will now be described as Embodiment 2 of the present invention. The irregularity map here refers to a map in which the surface of the subject projected in the image is divided according to its irregularities.

(Embodiment 2)

Figure 16:
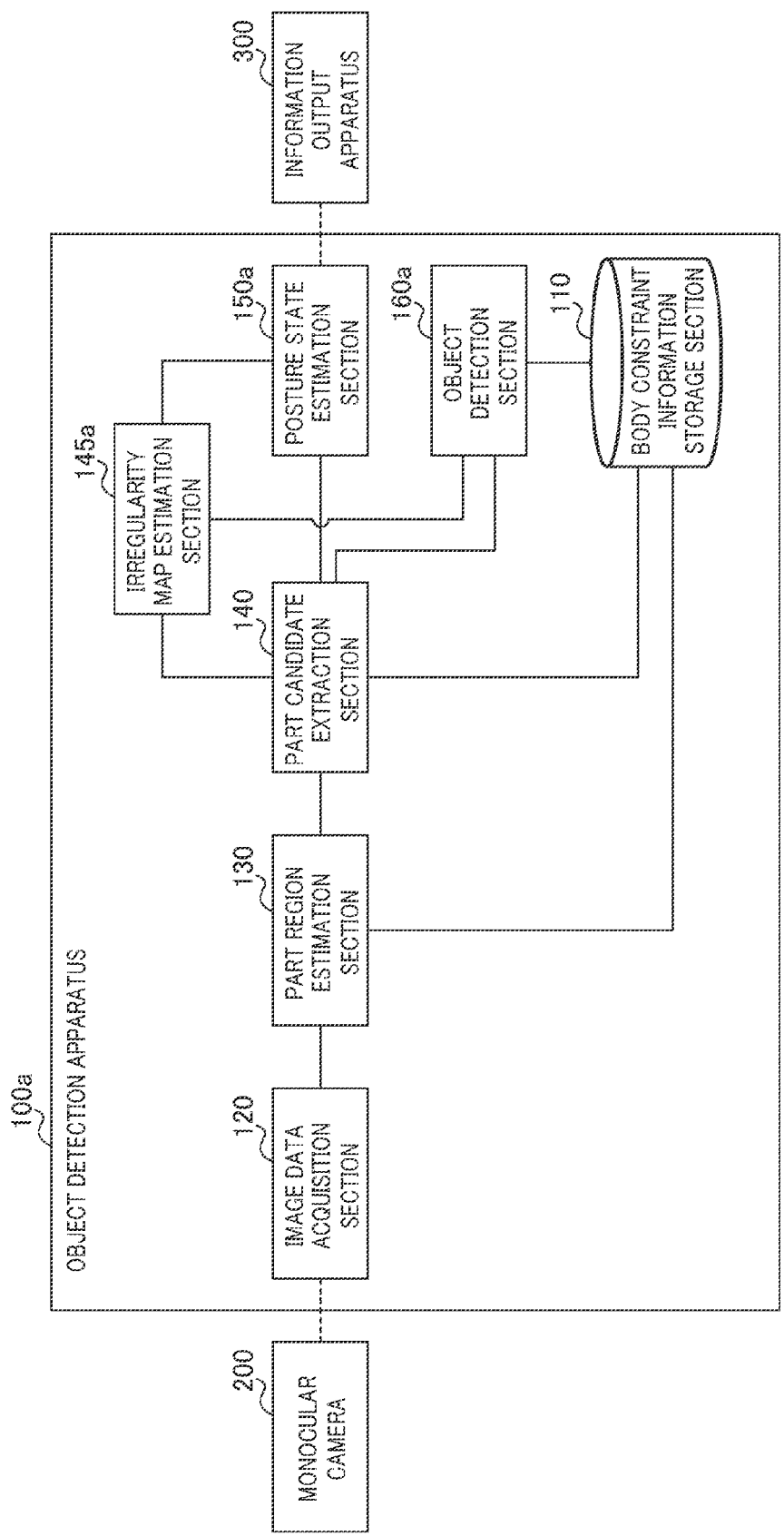
FIG. 16 is a block diagram showing a main part configuration of an object detection apparatus according to Embodiment 2 of the present invention.

FIG. 16 is a block diagram showing a main part configuration of an object detection apparatus according to Embodiment 2 of the present invention, which corresponds to object detection apparatus 100 in FIG. 1 of Embodiment 1. Note that, in FIG. 16, configuration elements common to those in FIG. 1 are denoted by the same reference signs as those in FIG. 1, and description thereof is omitted.

In addition to the configuration in FIG. 1, object detection apparatus 100a in FIG. 16 further includes irregularity map estimation section 145a. Instead of posture state estimation section 150 and object detection section 160 in FIG. 1, object detection apparatus 100a includes posture state estimation section 150a and object detection section 160a.

Irregularity map estimation section 145a generates an irregularity map of each part. More specifically, irregularity map estimation section 145a receives the estimated likelihood map and the image data from part candidate extraction section 140. Then, irregularity map estimation section 145a generates the irregularity map on the basis of the received information, and outputs the generated irregularity map to posture state estimation section 150a. Details of the method of generating the irregularity map will be described later. The irregularity map generated from the image data is hereinafter referred to as "estimated irregularity map".

In addition to the learned likelihood map, posture state estimation section 150a holds in advance, for each posture state, an irregularity map learned from the reference model in that posture state (hereinafter referred to as "learned irregularity map"). Then, posture state estimation section 150a estimates the posture state of the subject on the basis of the level of match between the estimated irregularity map and the learned irregularity map as well as the level of match between the estimated likelihood map and the learned likelihood map. That is, in addition to the operation of Embodiment 1, posture state estimation section 150a further performs matching between the estimated irregularity map and the learned irregularity map.

For a joint whose position cannot be estimated from the part axes, object detection section 160a estimates the position of the joint on the basis of the estimated irregularity map.

Figure 17:
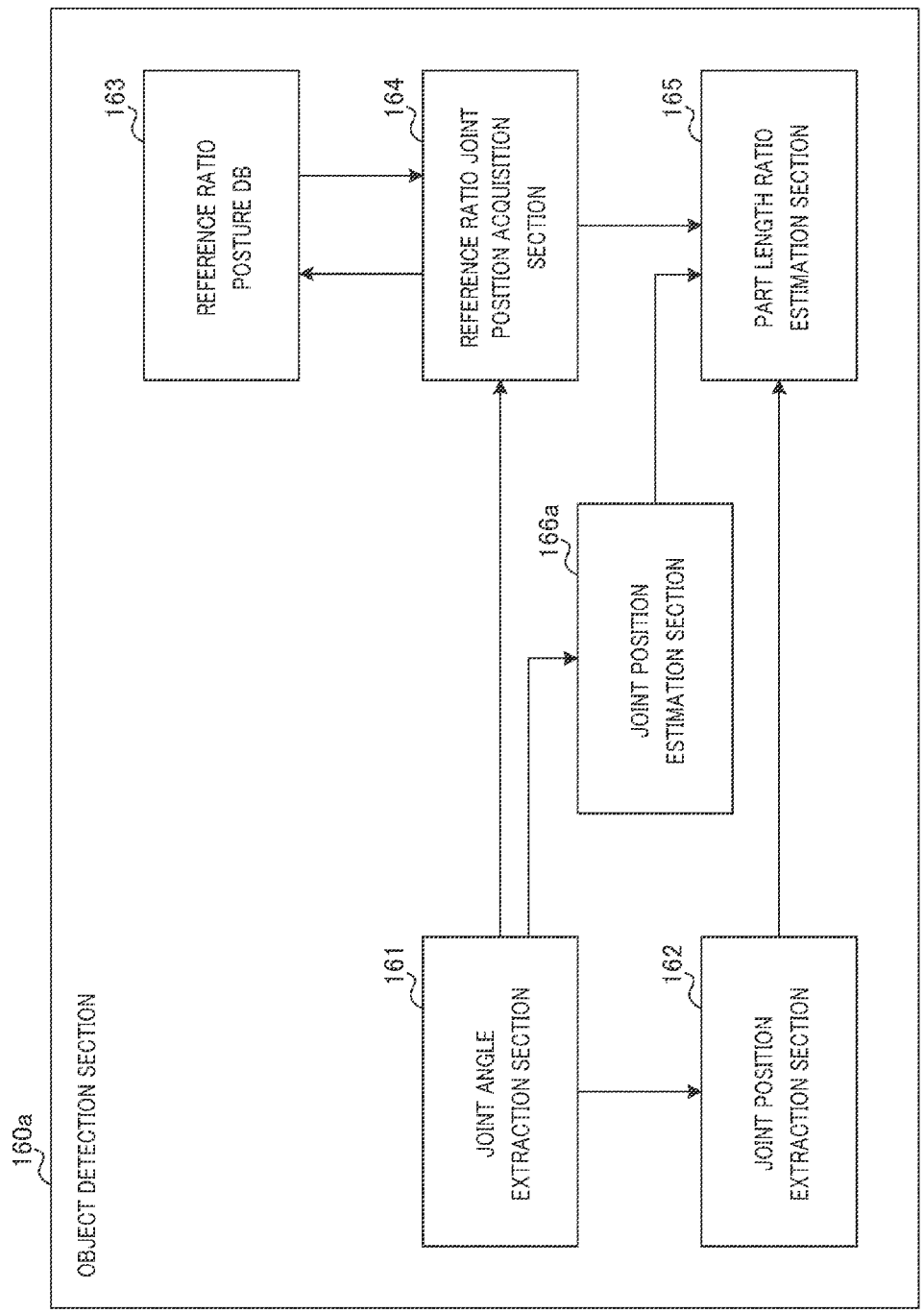
FIG. 17 is a block diagram showing a configuration example of an object detection section according to Embodiment 2.

FIG. 17 is a block diagram showing a configuration example of object detection section 160a, which corresponds to FIG. 3 of Embodiment 1. The same elements as those in FIG. 3 are denoted by the same reference signs, and description thereof is omitted.

As shown in FIG. 17, object detection section 160a further includes joint position estimation section 166a.

Joint position estimation section 166a receives the estimated irregularity map from irregularity map estimation section 145a, and estimates the joint position of the joint whose joint position cannot be extracted, from the received estimated irregularity map. More specifically, for example, joint position estimation section 166a refers to the value of the estimated irregularity map at each pixel position on the part axis in order from the start point to the end point of the part axis, and extracts a position at which the value of the estimated irregularity map changes, as the joint position. Then, joint position estimation section 166a outputs the obtained joint position (in other words, the estimated joint position) to part length ratio estimation section 165 together with its ID.

The joint whose joint position cannot be extracted refers to, for example, the case where the angle between part axes is the same between adjacent parts. Because object detection section 160a according to the present embodiment uses the irregularity map, joint position extraction is possible even in the case where the angle between part axes is the same.

The irregularity map will first be described.

Irregularity map estimation section 145a estimates the orientation of the surface of a part from brightness information of the part in the image. Joint position estimation section 166a estimates one region having a surface equally indicated by the irregularity map, as the region of one part, to thereby estimate the joint position. The brightness here refers to, for example, the level of luminance, and the brightness information here refers to information indicating luminance or the level of luminance.

FIGS. 18A to 18E illustrate the relation between the posture of a person and the brightness of each part.

Figure 18E:
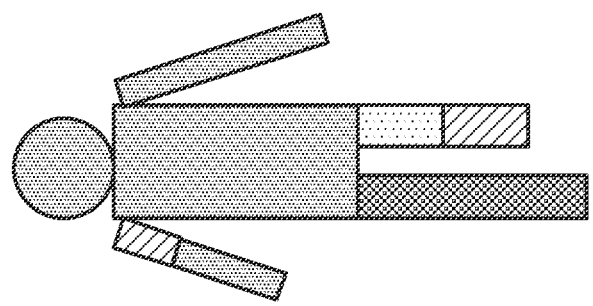
FIGS. 18A to 18E illustrate the relation between the posture of a person and the brightness of each part according to Embodiment 2.
Figure 18D:
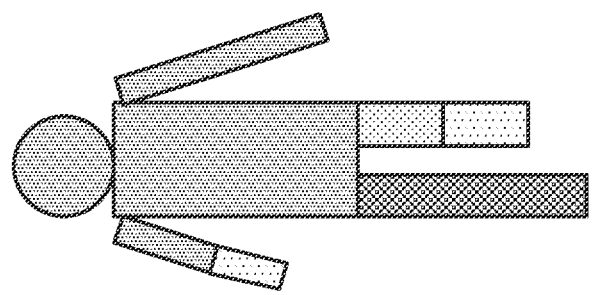
Figure 18C:
Figure 18B:
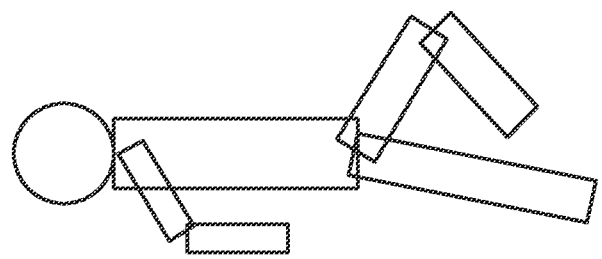
Figure 18A:
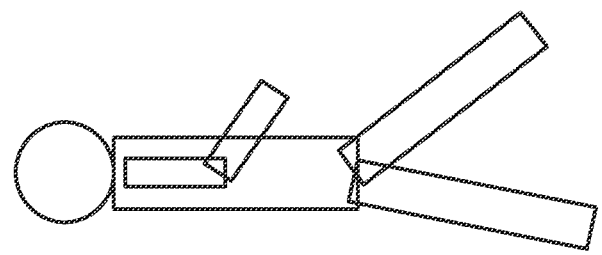

A first posture shown in FIG. 18A and a second posture shown in FIG. 18B are different from each other, but it is assumed that the first and second postures have the same silhouette as viewed from the front as shown in FIG. 18C. In this case, it is not possible to correctly estimate whether the posture of the target person is the first posture or the second posture, only from region information defined by edges of the front image.

For example, it is understood, from the silhouette shown in FIG. 18C, that the length of the right arm is smaller than the length of the left arm, and hence it can be inferred that the right elbow is highly likely to be bent. There are, however, a variety of bending forms that satisfy the body constraint. As shown in FIG. 18A and FIG. 18B, there are also a variety of angles of the entire right arm.

For example, it is understood, from the silhouette shown in FIG. 18C, that the length of the left leg is smaller than the length of the left arm, and hence it can be inferred that the left knee is likely to be bent. There may be, however, cases as shown in FIG. 18A and FIG. 18B where the left knee is bent and where the left knee is straight.

If the border positions (in other words, the joints) between the upper arm and the forearm and between the thigh and the crus can be estimated, it is possible to estimate which of the variety of postures described above the target person has. Unfortunately, in the case of such a posture as shown in FIG. 18C where the arms and the legs look straight, it is difficult to estimate these border positions even using the body constraint, only from the region information defined by edges.

In view of the above, in order to deal with such a posture whose joint position cannot be identified only from the region information, object detection apparatus 100a estimates the part region using the brightness information as well as the region information.

FIG. 18D shows, using color density, the brightness of each part in the first posture as taken from the front when natural light from the above is a light source. FIG. 18E shows, using color density, the brightness of each part in the second posture as taken from the front when natural light from the above is a light source. In these figures, a higher color density means a lower brightness (darker). Further, it is assumed that five levels of "−2, −1, 0, 1, 2" are defined as the brightness in order from the darkest level. The level "0" is, for example, a level of brightness of a surface perpendicular to the ground.

The level of brightness of each region of the image is higher for a region having a surface that faces more upward, and is lower for a region having a surface that faces more downward.

For example, as shown in FIG. 18D and FIG. 18E, for both the first and second postures, the regions of the head, the torso, and the left arm are in the level "0", and the region of the right leg is in the level "−1", which is slightly darker.

In the first posture, the right upper arm extends perpendicularly downward, and the right forearm extends frontward. Hence, as shown in FIG. 18D, the region of the right upper arm is in the level "0", and the region of the right forearm is in the level "2". In comparison, in the second posture, the right upper arm is drawn back, and the right forearm extends downward. Hence, as shown in FIG. 18E, the region of the right upper arm is in the level "−2", and the region of the right forearm is in the level "0".

In the first posture, the entire left leg extends frontward. Hence, as shown in FIG. 18D, the regions of the left thigh and the left crus are in the level "1". In comparison, in the second posture, the left thigh is moved upward, and the left crus extends backward. Hence, as shown in FIG. 18E, the region of the left thigh is in the level "2", and the region of the left crus is in the level "−2".

In this way, each part can be considered as a surface having the same brightness. Accordingly, from the brightness information of the part in the image, the orientation of the surface of the part can be estimated, and further, the position at which the orientation of the surface of the part changes can be inferred as the joint position. That is, the use of the brightness information enables joint position estimation (extraction) even for parts whose angle obtained from the region information is equal (a plurality of continuous parts having a straight silhouette, a plurality of parts having parallel straight lines).

Next, operations of object detection apparatus 100a configured as described above will be described with reference to a processing flow of FIG. 19. Note that, in FIG. 19, steps common to those in FIG. 4 of Embodiment 1 are denoted by the same step numbers as those in FIG. 4, and description thereof is omitted.

Upon the generation of the estimated likelihood map (S1400), the processing proceeds to S1410a.

In S1410a, irregularity map estimation section 145a performs an estimated irregularity map generation process. The estimated irregularity map generation process is a process of generating the estimated irregularity map from the image data acquired in S1100 and the estimated likelihood map generated in S1400.

Figure 19:
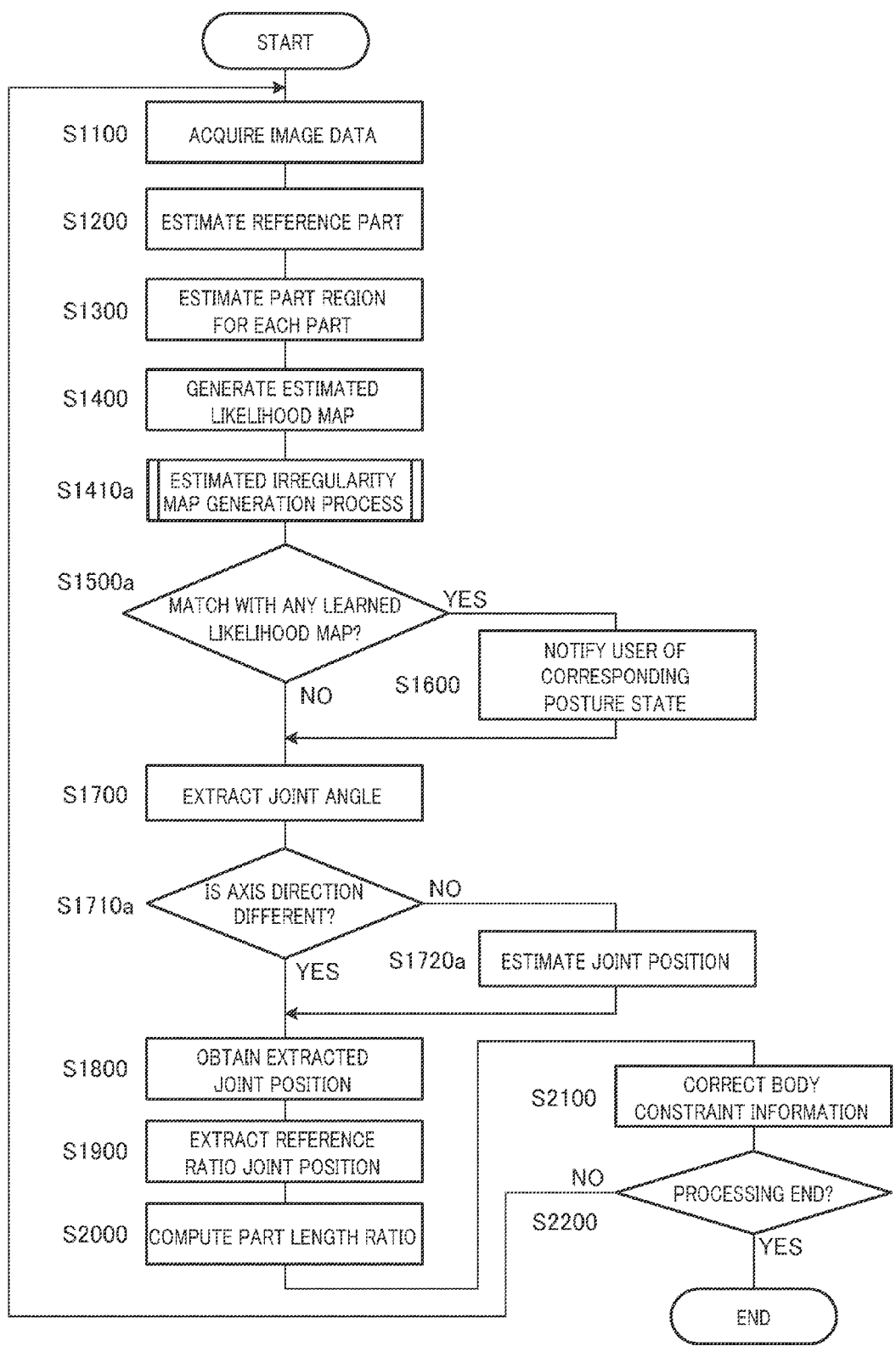
FIG. 19 shows a processing flow example of the object detection apparatus according to Embodiment 2.
Figure 20:
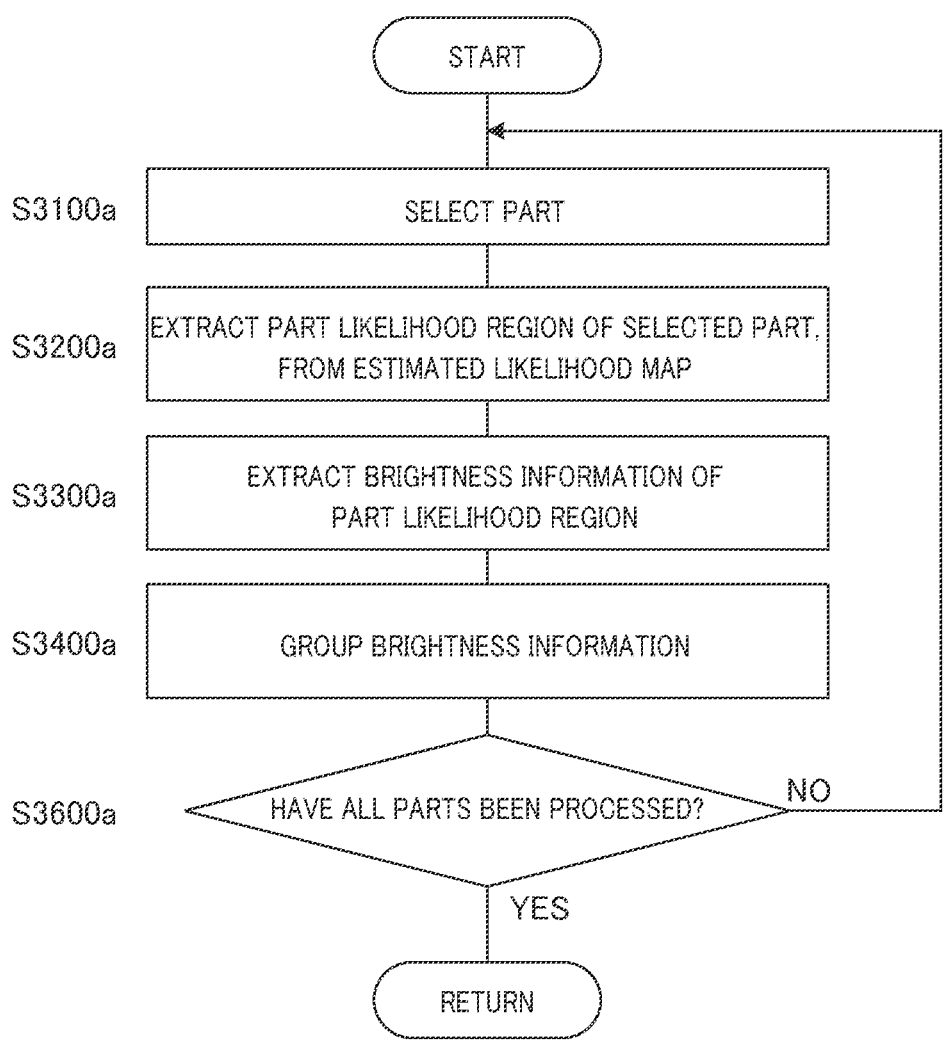
FIG. 20 shows a processing flow example of an irregularity map generation process according to Embodiment 2.

FIG. 20 shows a processing flow of the irregularity map generation process (step S1410a in FIG. 19).

In pixel-based information of the estimated irregularity map, for example, the likelihood of part k is expressed by pk. In the case where n parts exist, the pixel-based information has a data structure of irregularity vector Oij=[p1, p2, . . . , pk, . . . , pn]. The value of pk is indicated by binary information and takes, for example, any of 0 indicating that there is no possibility of the part k and 1 indicating that there is a possibility of the part k.

In S3100a, irregularity map estimation section 145a selects one part as the processing target. In the present embodiment, it is assumed that the joint position as the estimation target is the right elbow. In this case, irregularity map estimation section 145a takes the right arm to be the target of the irregularity map generation process, and first selects the right forearm farthest from the core part.

Then, in S3200a, irregularity map estimation section 145a acquires the region (hereinafter referred to as "part likelihood region") of the part selected in S3100a, from the estimated likelihood map generated in S1400. Here, irregularity map estimation section 145a extracts pixels whose likelihood of the right forearm in the estimated likelihood map exceeds a predetermined threshold, and takes the extracted pixels to be the part likelihood region of the right forearm.

Then, in S3300a, irregularity map estimation section 145a extracts the brightness information of the part likelihood region extracted in S3200a, from the image data acquired in S1100. The brightness information can be extracted by, for example, conversion into a grayscale image obtained by extracting only the luminance (pixel brightness) from the RGB value of each pixel forming the image data.

Then, in S3400a, irregularity map estimation section 145a groups the brightness information of the part likelihood region obtained in S3300a, with the use of a brightness threshold. The brightness threshold used by irregularity map estimation section 145a may be a fixed value set in advance, and may be dynamically set. An example method of dynamically setting the threshold will be described below.

Figure 21:
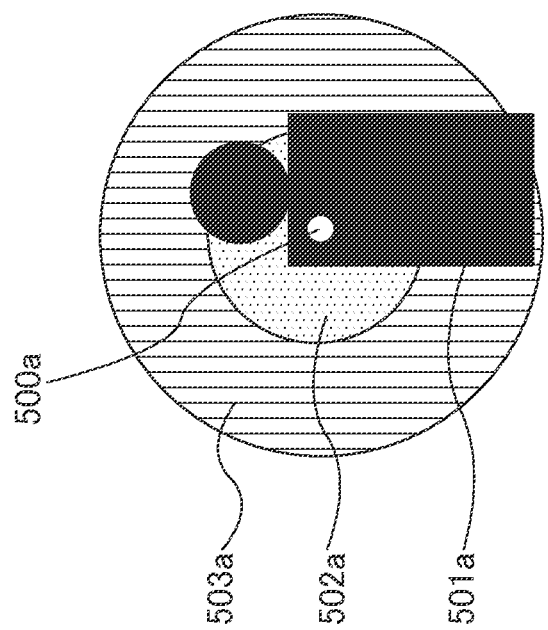
FIG. 21 illustrates a method for area classification according to Embodiment 2.

FIG. 21 illustrates a method for area classification using the body constraint of the right forearm. For ease of description, it is assumed that the torso has only the right arm.

In step S1200 in FIG. 19, for example, with estimated right shoulder position 500a as the reference, the head/shoulder region and torso region 501a connected thereto are estimated. In this case, the region in which the right upper arm and the right forearm can exist is as indicated by region 502a, and the region in which only the right forearm can exist is as indicated by region 503a. Regions 502b and 503b can be computed from, for example, the part region correspondence table shown in FIG. 11.

Irregularity map estimation section 145a first extracts the luminance value (brightness information) of pixels existing in region 503a, from this region 503a in which only the right forearm can exist, of the part likelihood region of the right forearm.

Then, assuming that a % of total number m of the target pixels is n, irregularity map estimation section 145a excludes n pieces in order from the smallest one and n pieces in order from the largest one, from the extracted luminance value data. Further, irregularity map estimation section 145a takes the smallest value and the largest value of the data after the exclusion of these 2n pieces of data (the number of pieces of data is m−2n) to be the threshold of the brightness information of the right forearm (the upper limit and the lower limit of the range of the luminance value regarded as the right forearm). Note that a is a value set in advance.

Then, for example, irregularity map estimation section 145a sets a value (for example, 1) indicating that there is a possibility of the right forearm, to a value indicating the right forearm, of irregularity vector Oij of pixels that fall within this threshold (that is, fall within the range of the luminance value regarded as the right forearm), in the part likelihood region of the right forearm.

In this way, irregularity map estimation section 145a sets the threshold of the luminance value using only the brightness information of the part likelihood region in which only the right forearm exists according to the body constraint. As a result, irregularity map estimation section 145a can identify the pixels having the brightness information of the right forearm without an influence of other parts.

Next, irregularity map estimation section 145a extracts the luminance value (brightness information) of pixels from region 502a in which only the right upper arm and the right forearm can exist, of the part likelihood region of the right forearm.

Then, irregularity map estimation section 145a deletes data that falls within the threshold of the brightness information of the right forearm obtained in the previous step, from the extracted luminance value data. Then, assuming that b % of total number p of remaining pieces of the luminance value data is q, irregularity map estimation section 145a excludes q pieces in order from the smallest one and q pieces in order from the largest one, from the extracted luminance value data. Further, irregularity map estimation section 145a takes the smallest value and the largest value of the data after the exclusion of these 2q pieces of data (the number of pieces of data is p−2q) to be the threshold of the brightness information of the right upper arm (the upper limit and the lower limit of the range of the luminance value regarded as the right upper arm). Note that b is a value set in advance.

Then, for example, irregularity map estimation section 145a sets a value (for example, 1) indicating that there is a possibility of the right upper arm, to a value indicating the right upper arm, of irregularity vector Oij of pixels that fall within this threshold (that is, fall within the range of the luminance value regarded as the right upper arm), in the part likelihood region of the right forearm.

In this way, irregularity map estimation section 145a excludes the data in the range of the luminance value regarded as the right forearm, from the data of the brightness information of the part likelihood region in which only the right upper arm and the right forearm exist according to the body constraint, to thereby set the threshold. As a result, irregularity map estimation section 145a can identify the pixels having the brightness information of the right upper arm without an influence of other parts, and can accurately identify the pixels having the brightness information of the right upper arm.

In this way, irregularity map estimation section 145a sets the threshold of the brightness information using the brightness information of the region in which only the target part exists, in order from parts farther from the core part, and groups the brightness information of each part to estimate the region.

Note that there may be a case where the part likelihood region of the right forearm does not exist in region 503a in which only the right forearm can exist. In such a case, irregularity map estimation section 145a may perform, for example, a process of: extracting the luminance information of pixels existing in region 502a in which only the right upper arm and the right forearm can exist, of the part likelihood regions of the right forearm and the right upper arm; and making a classification into two groups of the right forearm and the right upper arm. Then, irregularity map estimation section 145a sets the above-mentioned threshold using, for example, Otsu's binarization. As a result, even in the case where the part likelihood region of the right forearm does not exist in region 503a in which only the right forearm can exist, irregularity map estimation section 145a can set the thresholds of the brightness information of the right upper arm and the right forearm.

There may be a case where, after the setting of the brightness information of the right forearm for region 503a in which only the right forearm can exist, a threshold different from that of the right forearm cannot be set because a pixel having brightness information different from that of the right forearm does not exist in spite of region 502a in which only the right upper arm and the right forearm can exist. In such a case, irregularity map estimation section 145a may set, for example, the same value as that of the right forearm to the brightness information of the right upper arm. As a result, even in the case where the orientations of the surfaces of the right upper arm and the right forearm are similar to each other (where the right arm is straight), irregularity map estimation section 145a can set the brightness information of the right upper arm.

In S3600a in FIG. 20, irregularity map estimation section 145a determines whether or not all the parts as the targets of the irregularity map generation process have been processed. For example, in the case where the estimated irregularity map is generated also for the left arm, irregularity map estimation section 145a returns to S3100a, and performs processing similar to that performed on the right arm, on the left arm.

Then, irregularity map estimation section 145a outputs the generated estimated irregularity map to posture state estimation section 150a and joint position estimation section 166a.

In S1500a in FIG. 19, posture state estimation section 150a performs matching between the learned likelihood map and the estimated likelihood map, and then performs matching between the learned irregularity map and the estimated irregularity map. Then, posture state estimation section 150a determines whether or not the estimated likelihood map matches with any learned likelihood map, similarly to Embodiment 1.

More specifically, in the case where the value of the likelihood of the irregularity map is binary, posture state estimation section 150a evaluates, for each pixel, the level of match in likelihood between the estimated irregularity map and the learned irregularity map. For example, posture state estimation section 150a counts, for every pixel, pixels having the same ID, and determines a learned irregularity map having the largest count value, as a map having a high level of match with the estimated irregularity map. Note that, similarly to the likelihood map, in the case where the size is different, posture state estimation section 150a may first enlarge or reduce the image region and then perform matching.

As described in FIG. 18, posture states having the same learned likelihood map but different learned irregularity maps can exist. Accordingly, more accurate posture state estimation is possible by performing not only matching with the learned likelihood map but also matching with the learned irregularity map. In the case where both the learned likelihood map and the learned irregularity map are different, the two-dimensional silhouettes of a person are different, and, in addition, the part irregularities are different. Hence, it can be determined that the three-dimensional postures are different.

Then, after the extraction of the joint angle (S1700), in step S1710a, joint position estimation section 166a determines whether or not the axis direction is different between adjacent parts (in other words, whether or not the joint angle is 180 degrees). If the axis direction is different (S1710a: YES), joint position estimation section 166a proceeds to step S1800. If the axis direction is the same (S1710a: NO), joint position estimation section 166a proceeds to step S1720a. In the case where the directions of the part axes are the same, the point of intersection cannot be uniquely determined, and hence it is difficult to estimate the joint position from the part axes.

In step S1720a, joint position estimation section 166a estimates the joint position on the basis of the estimated irregularity map, and proceeds to step S1800.

Specifically, for example, joint position estimation section 166a refers to the value of the irregularity map at each pixel position on the part axis in order from the start point to the end point of the straight line of the parts of the right upper arm and the right forearm. Then, joint position estimation section 166a extracts a pixel position at which the value of the irregularity map changes, as the joint position. In the case where there are a plurality of such pixels, joint position estimation section 166a may output the center position thereof as the joint position.

Then, joint position estimation section 166a outputs the obtained joint position (in other words, the estimated joint position) and the ID of the joint to part length ratio estimation section 165. Part length ratio estimation section 165 acquires the position of the part on the basis of the joint position received from the joint position extraction section and the joint position received from joint position estimation section 166a.

As described above, because object detection apparatus 100a according to the present embodiment generates the irregularity map and estimates the position of each joint on the basis of the irregularity map, even in the case where the angles of the straight lines of parts are the same and where the part lines of parts connected to each other are parallel, the part length ratio can be obtained. As a result, the accuracy of posture estimation can be improved. Moreover, because object detection apparatus 100a uses matching with the irregularity map in combination, the accuracy of posture estimation can be further improved. Note that, in FIG. 16, description is given of the example in which the result obtained by the irregularity map estimation section is outputted to both posture state estimation section 150a and object detection section 160a, but the result may be applied to only one of the two sections.

The disclosure of the specification, drawings, and abstract included in Japanese Patent Application No. 2010-274674 filed on Dec. 9, 2010, is incorporated herein by reference in its entirety.

INDUSTRIAL APPLICABILITY

The present invention is useful for object detection apparatuses and object detection methods capable of accurately detecting information regarding an object having joints, from image data.

REFERENCE SIGNS LIST 100, 100a object detection apparatus
110 Body constraint information storage section
120 Image data acquisition section
130 Part region estimation section
140 Part candidate extraction section
145a irregularity map estimation section
150, 150a posture state estimation section
160, 160a object detection section
161 joint angle extraction section
162 joint position extraction section
163 reference ratio posture database
164 reference ratio joint position acquisition section
165 part length ratio estimation section
166a joint position estimation section
200 Monocular camera
300 Information output apparatus

The invention claimed is:

1. An object detection apparatus that detects information regarding an object comprising a plurality of parts articulated by joints, from image data that images the object, the object detection apparatus comprising:
    a part candidate extraction section that extracts position candidates of adjacent two of the parts from the image data, using constraint information of a reference model of the object;
    a joint angle extraction section that extracts an angle of a joint that articulates the two parts, from the extracted position candidates, and outputs positions and directions of part axes of the two parts, the part axes forming the extracted angle of the joint;
    a joint position extraction section that extracts a position of the joint of the object, from the positions and directions of the part axes acquired from the joint angle extraction section;
    a reference ratio joint position acquisition section that acquires a position of one of joints of the reference model, the one corresponding to the joint that articulates the two parts; and
    a part length ratio estimation section that detects, as the information regarding the object, a ratio of: a length of a given part of the object; to a length of a part of the reference model corresponding to the given part, on a basis of the position of the joint of the object and the position of the joint of the reference model, wherein
    the part length ratio estimation section corrects the constraint information on a basis of information regarding the estimated ratio.

2. The object detection apparatus according to claim 1, wherein the joint angle extraction section extracts an angle between respective longitudinal axes of the two parts from the position candidates of the two parts, as the angle of the joint that articulates the two parts.

3. The object detection apparatus according to claim 1, wherein the reference ratio joint position acquisition section estimates a posture state of the object on a basis of the angle of the joint, and makes the comparison with the reference model in the estimated posture state.

4. The object detection apparatus according to claim 1, wherein the object is a person.

5. The object detection apparatus according to claim 1, further comprising an irregularity map estimation section that generates an irregularity map that is a map in which a surface of a subject in an image of the image data is divided according to irregularities thereof, wherein
the joint position extraction section extracts the position of the joint of the object from the extracted irregularity map, at least when extraction of the position of the joint of the object from the angle of the joint is impossible.

6. An object detection method that detects information regarding an object comprising a plurality of parts articulated by joints, from image data that images the object, the object detection method comprising:
extracting, by a part candidate extraction section, position candidates of adjacent two of the parts from the image data, using constraint information of a reference model of the object;
extracting, by a joint angle extraction section, an angle of a joint that articulates the two parts, from the extracted position candidates, and outputting positions and directions of part axes of the two parts, the part axes forming the extracted angle of the joint;
extracting, by a joint position extraction section, a position of the joint of the object, from the positions and directions of the part axes acquired from the joint angle extraction section;
acquiring, by a reference ratio joint position acquisition section, a position of one of joints of the reference model, the one corresponding to the joint that articulates the two parts; and
detecting, by a part length ratio estimation section, as the information regarding the object, a ratio of: a length of a given part of the object; to a length of a part of the reference model corresponding to the given part, on a basis of the position of the joint of the object and the position of the joint of the reference model, and correcting, by the part length ratio estimation section, the constraint information on a basis of information regarding the estimated ratio.

* * * * *